(12) United States Patent
Brubaker et al.

(10) Patent No.: US 11,847,935 B2
(45) Date of Patent: Dec. 19, 2023

(54) PROMPTING USERS TO ANNOTATE SIMULATED PHISHING EMAILS IN CYBERSECURITY TRAINING

(71) Applicant: Proofpoint, Inc., Sunnyvale, CA (US)

(72) Inventors: Jason R. Brubaker, East Berlin, PA (US); Benjamin C. Blanchard, Pittsburgh, PA (US)

(73) Assignee: Proofpoint, Inc., Sunnyvale, CA (US)

( * ) Notice: Subject to any disclaimer, the term of this patent is extended or adjusted under 35 U.S.C. 154(b) by 290 days.

(21) Appl. No.: 17/104,767

(22) Filed: Nov. 25, 2020

(65) Prior Publication Data

US 2021/0407308 A1 Dec. 30, 2021

Related U.S. Application Data

(60) Provisional application No. 63/043,529, filed on Jun. 24, 2020.

(51) Int. Cl.
*G09B 5/02* (2006.01)
*G06Q 10/06* (2023.01)
(Continued)

(52) U.S. Cl.
CPC .......... *G09B 5/02* (2013.01); *G06Q 10/06393* (2013.01); *G06Q 10/107* (2013.01); *H04L 51/42* (2022.05); *H04L 63/1483* (2013.01)

(58) Field of Classification Search
CPC .......... G09B 5/02; G06Q 10/10; G06Q 10/06; G06Q 10/06393; G06Q 10/107;
(Continued)

(56) References Cited

U.S. PATENT DOCUMENTS 5,867,163 A * 2/1999 Kurtenbach .............. G06F 8/34
715/840
7,949,659 B2 * 5/2011 Chakrabarti .......... G06F 16/335
707/769
(Continued)

FOREIGN PATENT DOCUMENTS

WO 2019207574 A1 10/2019

OTHER PUBLICATIONS

Nov. 19, 2021 (EP) EESR—App. No. 21177870.9.

*Primary Examiner* — Eddy Saint-Vil
(74) *Attorney, Agent, or Firm* — Banner & Witcoff, Ltd.

(57) ABSTRACT

Aspects of the disclosure relate to dynamically generating simulated attack messages configured for annotation by users as part of cybersecurity training. A computing platform may generate a simulated attack message including a plurality of elements and send the simulated attack message to an enterprise user device. Subsequently, the computing platform may receive, from the enterprise user device, user selections annotating selected elements of the plurality of elements of the simulated attack message. The computing platform may thereafter identify one or more training areas for the user based on the user selections received from the enterprise user device, generate a customized training module specific to the identified one or more training areas, and send the customized training module to the enterprise user device. Sending the customized training module to the enterprise user device may cause the enterprise user device to display the customized training module.

20 Claims, 14 Drawing Sheets

(51) Int. Cl.
*H04L 51/42* (2022.01)
*G06Q 10/0639* (2023.01)
*G06Q 10/107* (2023.01)
*H04L 9/40* (2022.01)

(58) Field of Classification Search
CPC ..... H04L 29/06; H04L 12/58; H04L 63/1483; H04L 51/42
See application file for complete search history.

(56) References Cited

U.S. PATENT DOCUMENTS

| | | | | |
|---|---|---|---|---|
| 8,572,184 B1* | 10/2013 | Cosoi | ................... | H04L 51/212 709/224 |
| 2002/0003547 A1* | 1/2002 | Wang | ................... | G06F 16/957 707/E17.119 |
| 2004/0072130 A1* | 4/2004 | Safran, Sr. | ............... | G09B 7/02 434/169 |
| 2006/0149820 A1* | 7/2006 | Rajan | ..................... | H04L 51/212 709/206 |
| 2008/0319932 A1* | 12/2008 | Yih | ....................... | G06Q 10/10 706/20 |
| 2012/0124671 A1* | 5/2012 | Fritzson | ................. | G06F 21/577 726/26 |
| 2013/0198207 A1* | 8/2013 | Dolan | .................... | G16H 50/20 707/749 |
| 2014/0237386 A1* | 8/2014 | Barrington | ........... | G06Q 10/103 715/753 |
| 2014/0370485 A1* | 12/2014 | Deane | ..................... | G09B 7/02 434/353 |
| 2015/0058358 A1* | 2/2015 | Xu | ....................... | G06F 16/335 707/748 |
| 2015/0287336 A1* | 10/2015 | Scheeres | ................. | G09B 5/02 434/156 |
| 2016/0140858 A1* | 5/2016 | Adderly | ................... | G09B 7/02 704/9 |
| 2017/0103674 A1* | 4/2017 | Sadeh-Koniecpol | .... | G09B 5/02 |
| 2019/0356679 A1* | 11/2019 | Sites | ................... | H04L 63/14 |
| 2021/0328969 A1* | 10/2021 | Gaddam | ................ | G06F 21/44 |

* cited by examiner

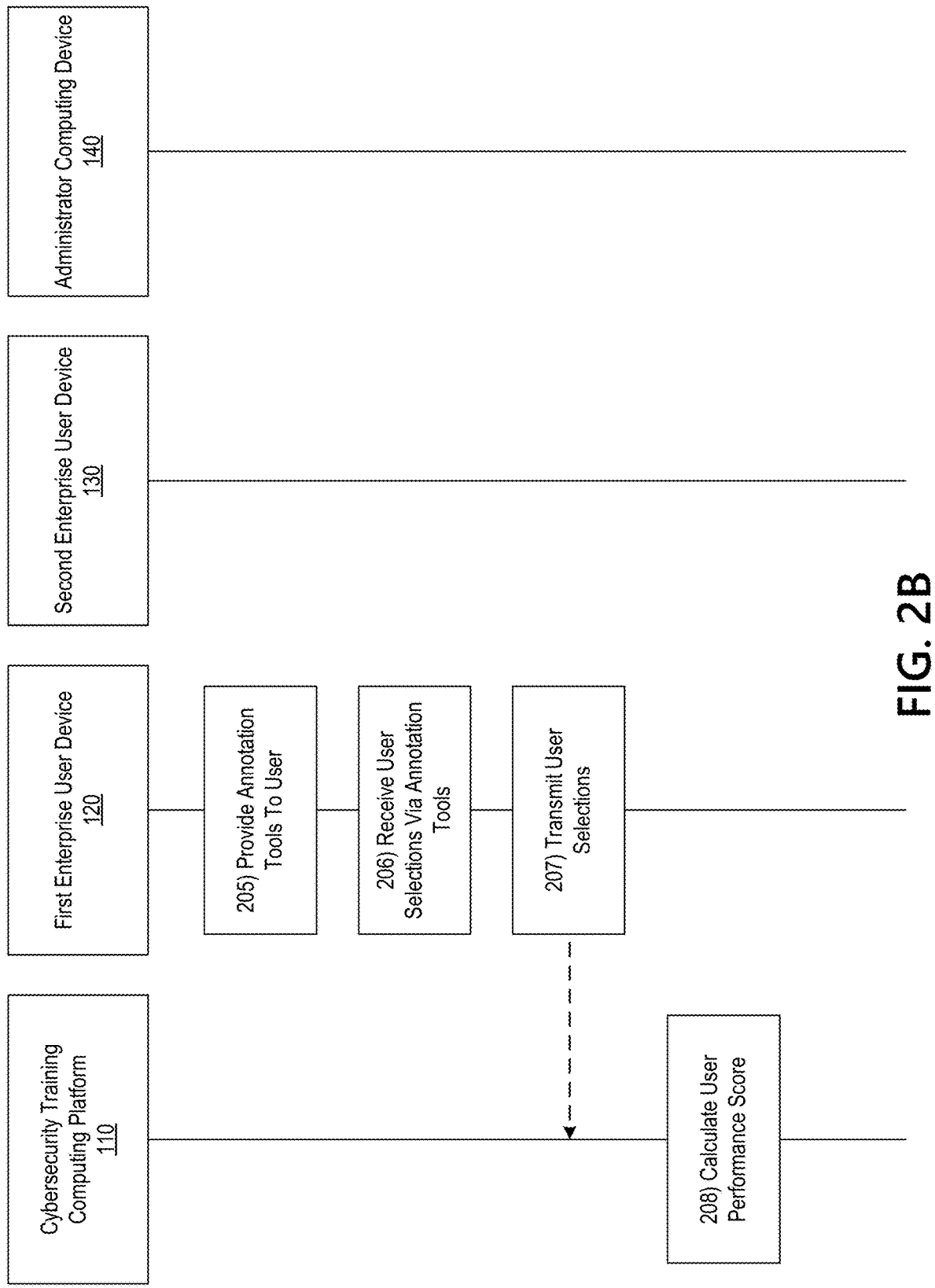

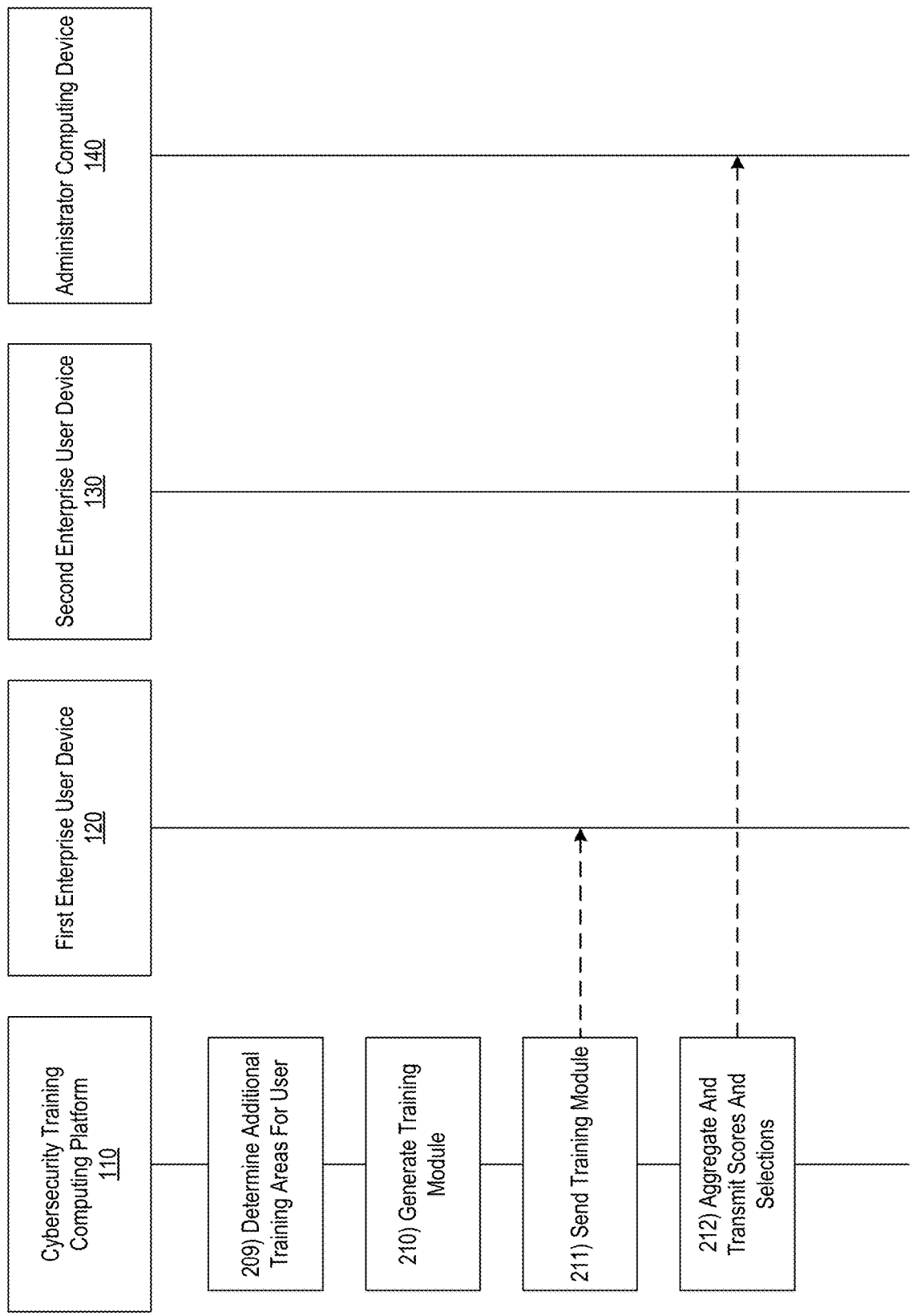

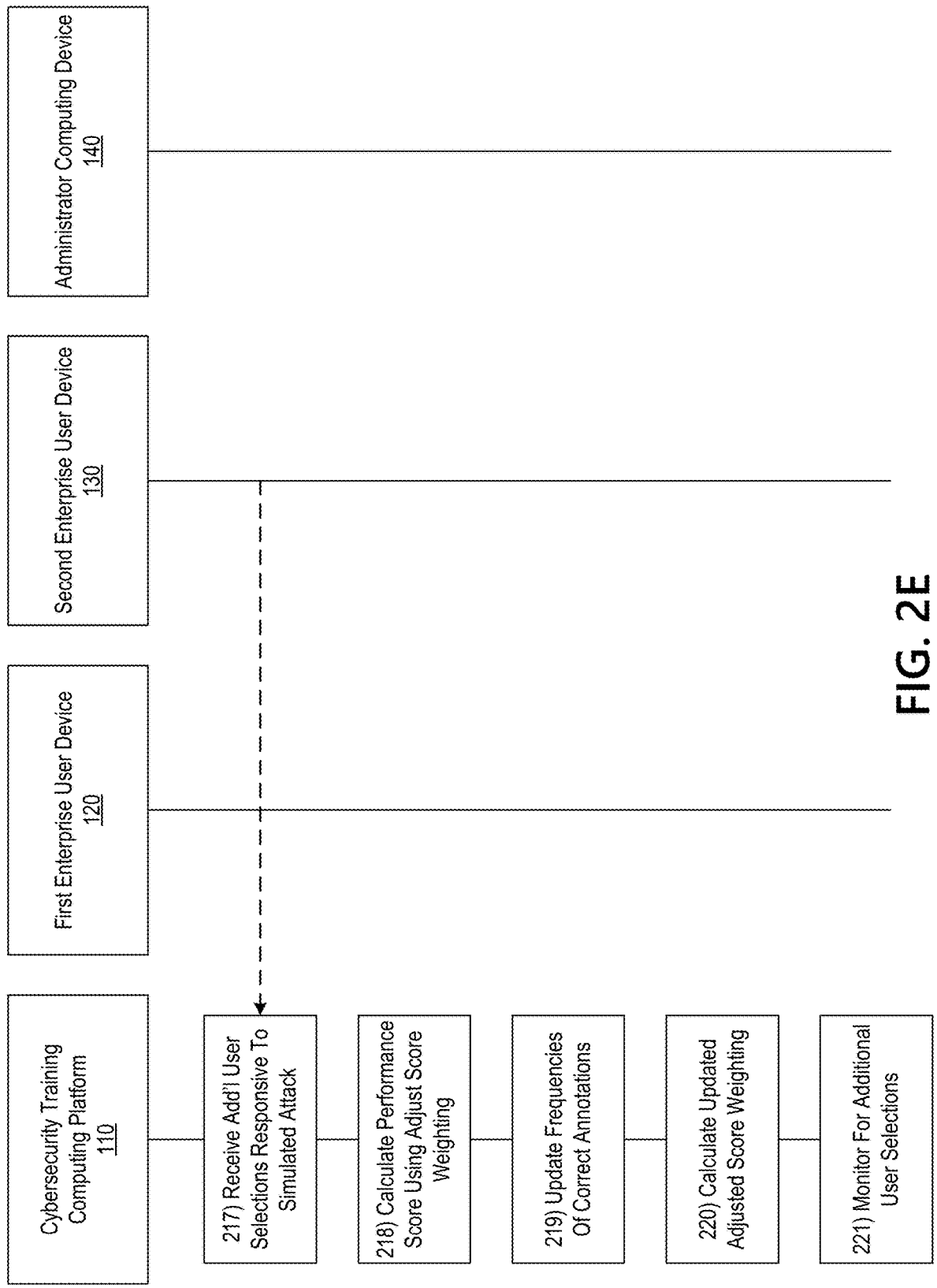

| | 500 |
|---|---|
| \multicolumn{2}{|c|}{Please Identify Malicious Elements} |
| Ann > | An Urgent Message from Ann at XXX Bank. |
| Bob > | |
| Cal > | >> This is XXX Bank. We have received a wire for $2MM that we believe belongs to you. |
| | >>Please respond ASAP with your name, checking account number, home address, and social security number, and we will send you the funds! |
| | >>If you do not respond by today, your funds will become unavailable. |
| Flag Msg | Click here to enter your information. |

FIG. 5

| | 600 |
|---|---|
| \multicolumn{2}{|c|}{Messages App} |
| Ann > | |
| Bob > | |
| Cal > | SURPRISE! |
| | You just fell for a simulated phishing message that we generated as a test. Interacting with a phishing message may be dangerous to both personal and enterprise security. Please click below to begin a module on phishing awareness and management. |
| | Begin Training Module |
| Flag Msg | |

FIG. 6 ization systems, and communication systems and networks. In particu-
PROMPTING USERS TO ANNOTATE SIMULATED PHISHING EMAILS IN CYBERSECURITY TRAINING

CROSS-REFERENCE TO RELATED APPLICATIONS

This application claims the benefit of and priority to U.S. Provisional Patent Application Ser. No. 63/043,529, filed Jun. 24, 2020, and entitled "Prompting Users to Annotate Simulated Phishing Emails in Cybersecurity Training," which is incorporated by reference herein in its entirety.

TECHNICAL FIELD

Aspects of the disclosure relate to digital data processing systems, data processing methods, machine learning systems, and communication systems and networks. In particular, one or more aspects of the disclosure relate to dynamically generated simulated attack messages configured for annotation by users as part of cybersecurity training.

BACKGROUND

Increasingly, organizations face various cybersecurity threats through electronic communications. Various methods have been developed to combat these threats, including training enterprise users (e.g., employees of the enterprise organization) to understand cybersecurity risks and recognize cybersecurity threats. In many instances, however, it may be difficult to train users to recognize and avoid cybersecurity threats in electronic communications. This problem may be particularly complex for large enterprise organizations with large user bases that have a wide range of skill sets and backgrounds. These issues are further compounded when trying to balance and optimize the providing of user training and the ensuring of network security with the consumption of computing resources, such as the processing power and network bandwidth that may be required to deliver such training and provide such security.

SUMMARY

Aspects of the disclosure provide technical solutions that overcome one or more of the technical problems described above and/or other technical challenges. For instance, one or more aspects of the disclosure relate to dynamically generated simulated attack messages configured for annotation by users as part of cybersecurity training.

In accordance with one or more embodiments, a computing platform having at least one processor, a communication interface, and memory may generate a simulated attack message, the simulated attack message including a plurality of elements. Subsequently, the computing platform may send the simulated attack message to an enterprise user device. The computing platform may then receive, from the enterprise user device, user selections annotating selected elements of the plurality of elements of the simulated attack message, identify one or more training areas for the user based on the user selections received from the enterprise user device, and generate a customized training module specific to the identified one or more training areas. Thereafter the computing platform may send, to the enterprise user device, the customized training module. Sending the customized training module to the enterprise user device may cause the enterprise user device to display the customized training module.

In some embodiments, identifying one or more training areas for the user may include calculating a user performance score based on the user selections. In some aspects, the user selections annotating selected elements of the plurality of elements of the simulated attack message may be received responsive to displaying the simulated attack message in a cybersecurity training application.

In some embodiments, the user selections annotating selected elements of the plurality of elements of the simulated attack message may be received responsive to displaying the simulated attack message in an email client application, and an initial user selection may include an interaction with the simulated attack message indicating that the simulated attack message has been marked as potentially suspicious or indicating that a user at the enterprise user device fell for the simulated attacked message.

In some embodiments, the user selections annotating selected elements of the plurality of elements of the simulated attack message may be received responsive to displaying a prompt at the enterprise user device to identify one or more potentially malicious elements of the simulated attack message. The user selections annotating selected elements of the plurality of elements of the simulated attack message may be received responsive to providing, at the enterprise user device, one or more annotation tools to allow user selections of elements of the simulated attack message.

In some embodiments, the memory may store additional computer-readable instructions that, when executed by the at least one processor, cause the computing platform to receive, from the enterprise user device, additional user selections categorizing the selected elements from a list of types of malicious elements. The user performance score may include a first score component based on portions of the simulated attack message correctly selected and a second score components based on portions of the simulated attack message correctly not selected.

In some embodiments, the memory may store additional computer-readable instructions that, when executed by the at least one processor, cause the computing platform to aggregate user selections received from a plurality of enterprise user devices, and transmit the aggregated user selections to an administrator computing device.

In some embodiments, the memory may store additional computer-readable instructions that, when executed by the at least one processor, cause the computing platform to compute a frequency with which elements are correctly selected by users. Generating the simulated attack message may then include assigning a baseline score weighting to each element of the plurality of elements. In such examples, the memory may store additional computer-readable instructions that, when executed by the at least one processor, cause the computing platform to assign an adjusted score weighting for each element of the plurality of elements based on the computed frequency with which elements are correctly selected by users. Identifying one or more training areas for the user may include calculating a user performance score based on the user selections and the adjusted score weighting for each element. In some examples, the memory may store additional computer-readable instructions that, when executed by the at least one processor, cause the computing platform to update a machine learning model used in generating the simulated attack message based on the computed frequency with which elements are correctly selected by users.

In accordance with one or more additional or alternative embodiments, a method may be provided at a computing platform having at least one processor, a communication interface, and memory. The method may include generating, by the at least one processor, a simulated attack message, the simulated attack message including a plurality of elements, and sending, by the at least one processor, via the communication interface, the simulated attack message to an enterprise user device, receiving, by the at least one processor, from the enterprise user device, user selections annotating selected elements of the plurality of elements of the simulated attack message, identifying, by the at least one processor, one or more training areas for the user based on the user selections received from the enterprise user device, generating, by the at least one processor, a customized training module specific to the identified one or more training areas, and sending, by the at least one processor, the customized training module to the enterprise user device, wherein sending the customized training module to the enterprise user device causes the enterprise user device to display the customized training module.

In some embodiments, the method may further include computing, by the at least one processor, a frequency with which elements are correctly selected by users. In some examples, generating the simulated attack message may include assigning a baseline score weighting to each element of the plurality of elements, and the method may further include assigning, by the at least one processor, an adjusted score weighting for each element of the plurality of elements based on the computed frequency with which elements are correctly selected by users. Identifying one or more training areas for the user may include calculating a user performance score based on the user selections and the adjusted score weighting for each element.

In some embodiments, the method may further include updating, by the at least one processor, a machine learning model used in generating the simulated attack message based on the computed frequency with which elements are correctly selected by users.

In some embodiments, the user selections annotating selected elements of the plurality of elements of the simulated attack message may be received responsive to displaying the simulated attack message in a cybersecurity training application.

In accordance with one or more additional or alternative embodiments, one or more non-transitory computer-readable media may be provided that store instructions that, when executed by a computing platform comprising at least one processor, a communication interface, and memory, cause the computing platform to: generate a simulated attack message, the simulated attack message including a plurality of elements; send, to an enterprise user device, the simulated attack message; receive, from the enterprise user device, user selections annotating selected elements of the plurality of elements of the simulated attack message; identify one or more training areas for the user based on the user selections received from the enterprise user device; generate a customized training module specific to the identified one or more training areas; and send, to the enterprise user device, the customized training module, where sending the customized training module to the enterprise user device causes the enterprise user device to display the customized training module.

BRIEF DESCRIPTION OF THE DRAWINGS

The present disclosure is illustrated by way of example and not limited in the accompanying figures in which like reference numerals indicate similar elements and in which:

FIGS. 2A-2H depict an illustrative event sequence for dynamically generating simulated attack messages configured for annotation by users as part of cybersecurity training in accordance with one or more example embodiments;

FIGS. 3-6 depict illustrative user interfaces for dynamically generating simulated attack messages configured for annotation by users as part of cybersecurity training in accordance with one or more example embodiments;

DETAILED DESCRIPTION

Figure 1A:
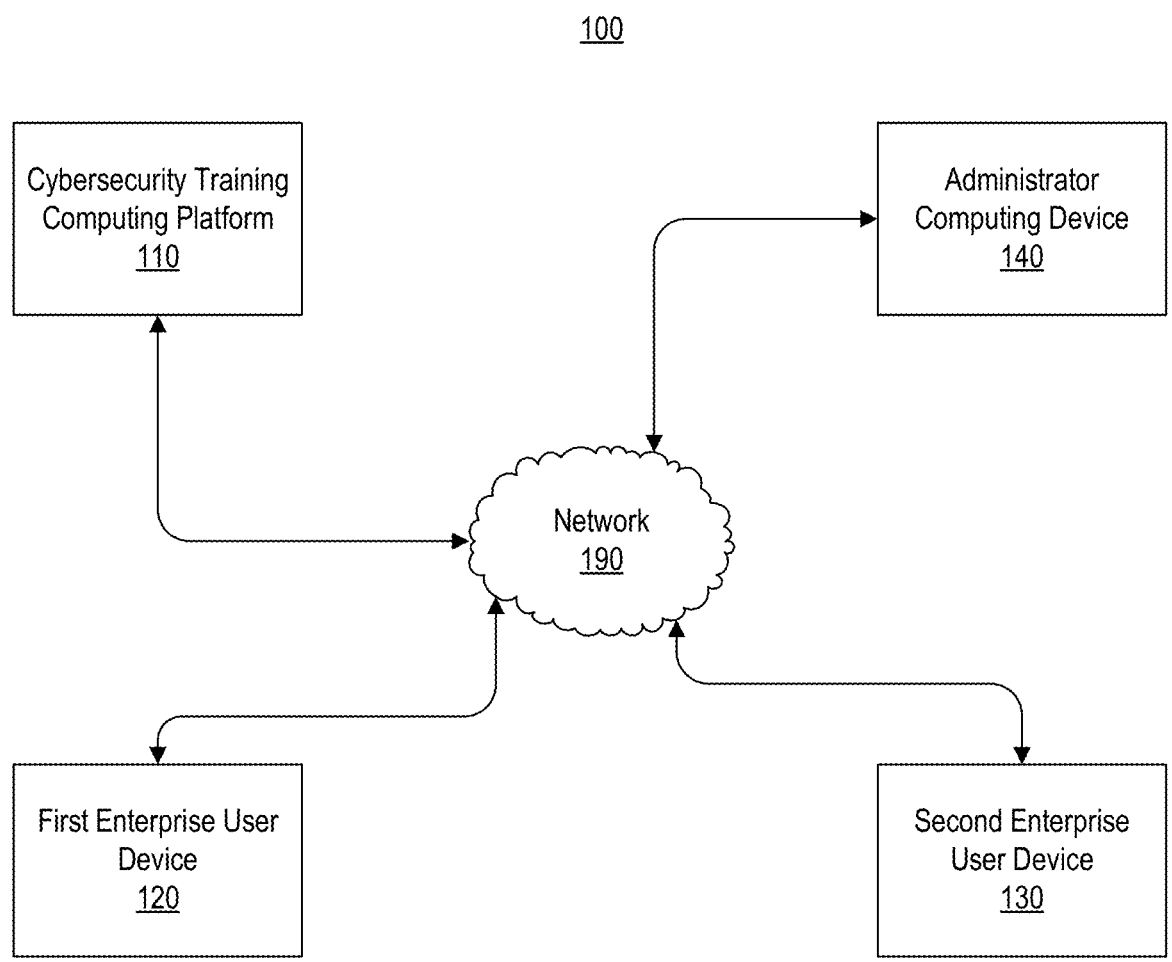
FIGS. 1A and 1B depict an illustrative operating environment for dynamically generating simulated attack messages configured for annotation by users as part of cybersecurity training in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to dynamically generating simulated attack messages configured for annotation by users as part of cybersecurity training. For example, systems and methods for prompting users to annotate simulated phishing emails in cybersecurity training may be provided. In some arrangements, a training platform may generate and display an email and prompt the user to mark different areas of the email as being potentially malicious. The training platform then may score the user based on what they mark (e.g., how close did the user get to marking 100% of the malicious elements in the email?). Over-marking the email and under-marking the email both may result in a lower score.

For example, a cybersecurity training computing platform comprising at least one processor, memory, and communication interface, may generate and send, to a user device, a user interface that includes a simulated attack message. For instance, the cybersecurity training computing platform may generate (and the user device may display) a simulated attack email that includes multiple threats in different regions, such as a simulated phishing email with a malicious 'recycling bin' link. The user interface may be displayed within or as part of a cybersecurity training portal or application.

A user of the user device may then be prompted to identify one or more potentially malicious elements in the simulated attack message. For instance, the cybersecurity training computing platform may embed into the user interface (and/or otherwise provide the user with) one or more annotation tools that allow the user to select the regions of the message that the user believes to be malicious.

In some instances, different types of malicious elements may be included in the simulated attack message. For instance, some malicious elements may be categorized as "threats," which may be links or other elements that the user can interact with which have some immediate effect on the user interface. Other malicious elements may be categorized as "red flag elements," which may include suspicious elements that should indicate to the user that the email is potentially malicious, such as distorted graphics or threatening language (e.g., "if you don't respond, your files will be permanently deleted").

A performance score for the user may then be calculated based on which potentially malicious elements were identified. For instance, the cybersecurity training computing platform may calculate the performance score based both on what the user selected as being potentially malicious and what the user did not select as being potentially malicious.

In some instances, the cybersecurity training computing platform may use the performance score to determine whether the user needs additional training in one or more specific areas, e.g., corresponding to which malicious elements the user identified incorrectly. The cybersecurity training computing platform then may provide the user with this training, e.g., by automatically enrolling the user in one or more training modules.

In some instances, in calculating the performance score, the frequency with which elements are appropriately annotated, e.g., across a group of users, may be used by the cybersecurity training computing platform as an input into the score itself. For example, when a new simulated attack message is deployed to the application, e.g., loaded for presentation within the training portal interface to the group of users, all of the threat elements may be worth the same amount in the final score. However, as different users annotate the message and/or otherwise identify one or more potentially malicious elements in the simulated attack message, the cybersecurity training computing platform may perform an analysis of which elements are more often annotated and which are less often annotated across the group of users. This may allow the cybersecurity training computing platform to grade and/or otherwise score each element based on a percentage of the users who correctly annotated the element. In addition, those elements that are annotated less often by the users may be worth more points during the scoring process performed by the cybersecurity training computing platform.

In some alternative arrangements, instead of generating and displaying a simulated attack message within a training portal interface, the cybersecurity training computing platform may generate and send a simulated attack email to a user. This simulated attack email may be received and displayed by the user's email client application. If the user falls for the simulated attack email, the cybersecurity training computing platform may route the user to an interface where the user can annotate the email, e.g., to identify what made the attack email convincing. For instance, the cybersecurity training computing platform may provide the user with a prompt such as: "We see that you fell for this simulated attack email. What elements were persuasive that led you to fall for it?"

In this way, the cybersecurity training computing platform may learn what elements of a simulated attack message are effective, as well as in what areas the user might require further cybersecurity training. This approach also may enable benchmarking of simulated attack messages. For instance, the cybersecurity training computing platform may dynamically adapt and/or otherwise modify how users are scored when identifying potentially malicious elements of emails based on how easy or hard it was to correctly identify different parts of the email as potentially malicious elements, as illustrated in greater detail below.

Figure 1B:
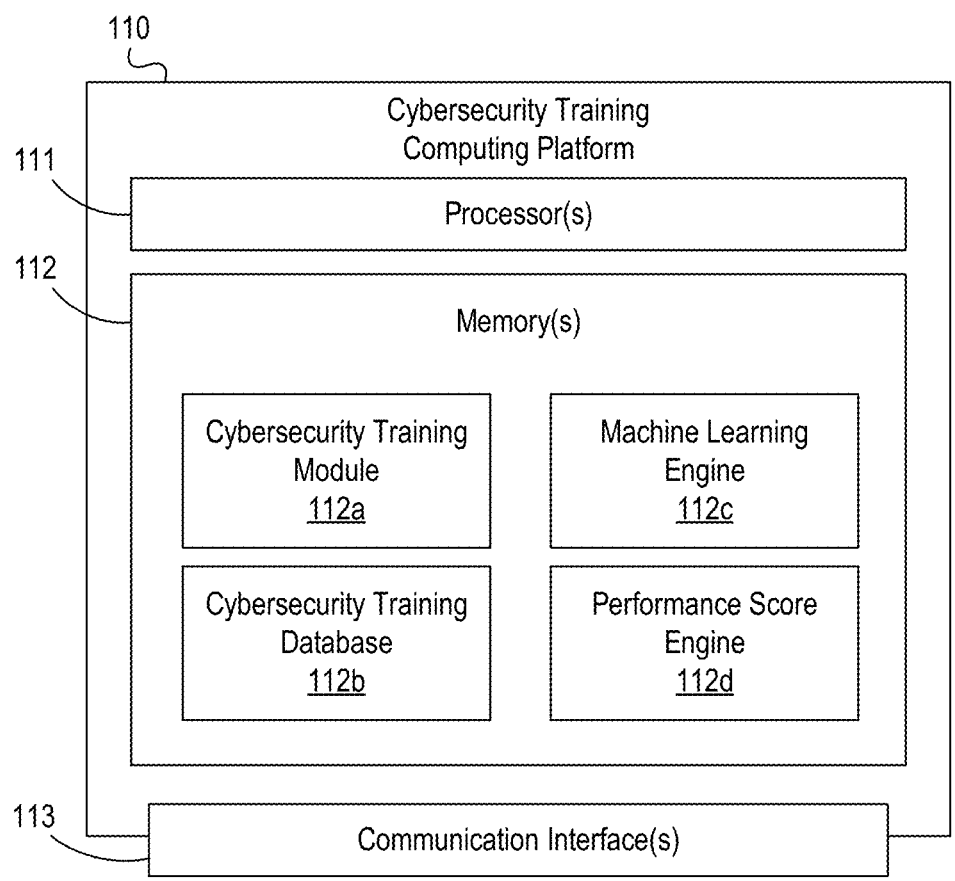

FIGS. 1A and 1B depict an illustrative operating environment for dynamically controlling access to linked content in electronic communications in accordance with one or more example embodiments. Referring to FIG. 1A, computing environment 100 may include various computer systems, computing devices, networks, and/or other operating infrastructure. For example, computing environment 100 may include a cybersecurity training computing platform 110, a first enterprise user device 120, a second enterprise user device 130, an administrator computing device 140, and a network 190.

Network 190 may include one or more wired networks and/or one or more wireless networks that interconnect cybersecurity training computing platform 110, first enterprise user device 120, second enterprise user device 130, administrator computing device 140, and/or other computer systems and/or devices. In addition, each of cybersecurity training computing platform 110, first enterprise user device 120, second enterprise user device 130, and administrator computing device 140 may be special purpose computing devices configured to perform specific functions, as illustrated in greater detail below, and may include specific computing components such as processors, memories, communication interfaces, and/or the like.

First enterprise computing device 120 may be configured to be used by a first user (who may, e.g., be an enterprise user associated with an enterprise organization operating administrator computing device 140 and/or cybersecurity training computing platform 110). In some instances, first enterprise user device 120 may be configured to present one or more user interfaces associated with an electronic messaging application, which may receive input composing new messages, display content associated with received messages, display alerts, and/or otherwise facilitate sending, receiving, and/or otherwise exchanging messages and/or other data with cybersecurity training computing platform 110, e.g., as part of a cybersecurity training session, and/or with one or more other client devices, enterprise user devices (e.g., second enterprise user device 130, or the like), and/or other devices.

Second enterprise computing device 130 may be configured to be used by a second user (who may, e.g., be an enterprise user associated with an enterprise organization operating administrator computing device 140 and/or cybersecurity training computing platform 110 and who may be different from the first user of first enterprise user device 120). In some instances, second enterprise user device 130 may be configured to present one or more user interfaces associated with an electronic messaging application, which may receive input composing new messages, display content associated with received messages, display alerts, and/or otherwise facilitate sending, receiving, and/or otherwise exchanging messages and/or other data with cybersecurity training computing platform 110, e.g., as part of a cybersecurity training session, and/or with one or more other client devices, enterprise user devices (e.g., first enterprise user device 120, or the like), and/or other devices.

Administrator computing device 140 may be configured to be used by an administrative user (who may, e.g., be a network administrator of an enterprise organization and/or who may operate cybersecurity training computing platform 110). Administrator computing device 140 may be configured to present one or more user interfaces associated with an administrative dashboard, receive and/or display one or more cybersecurity training results, and/or otherwise facilitate monitoring and management of one or more systems and/or devices included in computing environment 100.

Referring to FIG. 1B, cybersecurity training computing platform 110 may include one or more processor(s) 111, one or more memory(s) 112, and one or more communication interface(s) 113. In some instances, cybersecurity training computing platform 110 may be made up of a plurality of different computing devices, which may be distributed within a single data center or a plurality of different data centers. In these instances, the one or more processor(s) 111, one or more memory(s) 112, and one or more communication interface(s) 113 included in cybersecurity training computing platform 110 may be part of and/or otherwise associated with the different computing devices that form cybersecurity training computing platform 110.

In one or more arrangements, processor(s) 111 may control operations of cybersecurity training computing platform 110. Memory(s) 112 may store instructions that, when executed by processor(s) 111, cause cybersecurity training computing platform 110 to perform one or more functions, as discussed below. Communication interface(s) 113 may include one or more wired and/or wireless network interfaces, and communication interface(s) 113 may connect cybersecurity training computing platform 110 to one or more networks (e.g., network 190) and/or enable cybersecurity training computing platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause cybersecurity training computing platform 110 to perform various functions), databases (which may, e.g., store data used by cybersecurity training computing platform 110 in performing various functions), and/or other elements (which may, e.g., include processing engines, services, and/or other elements). For example, memory(s) 112 may store and/or otherwise provide a cybersecurity training module 112a, a cybersecurity training database 112b, a machine learning engine 112c, and a performance score engine 112d. In some instances, cybersecurity training module 112a may store instructions that cause cybersecurity training computing platform 110 to dynamically generate simulated attack messages configured for annotation by users and/or execute one or more other functions described herein. Additionally, cybersecurity training database 112b may store data that is used by cybersecurity training computing platform 110 in dynamically generating simulated attack messages and/or executing one or more other functions described herein. Machine learning engine 112c may store instructions and/or data that may cause and/or be used by cybersecurity training computing platform 110 to generate simulated attack messages, dynamically adjust one or more score weighting elements used in cybersecurity performance scoring, and/or execute one or more other functions described herein. Performance score engine 112d may store instructions and/or data that cause cybersecurity training computing platform 110 to compute performance scores based on user selections of a simulated attack message, and/or dynamically adjust one or more score weighting elements used in computing the performance score, e.g., in combination with machine learning engine 112c

Figure 2A:
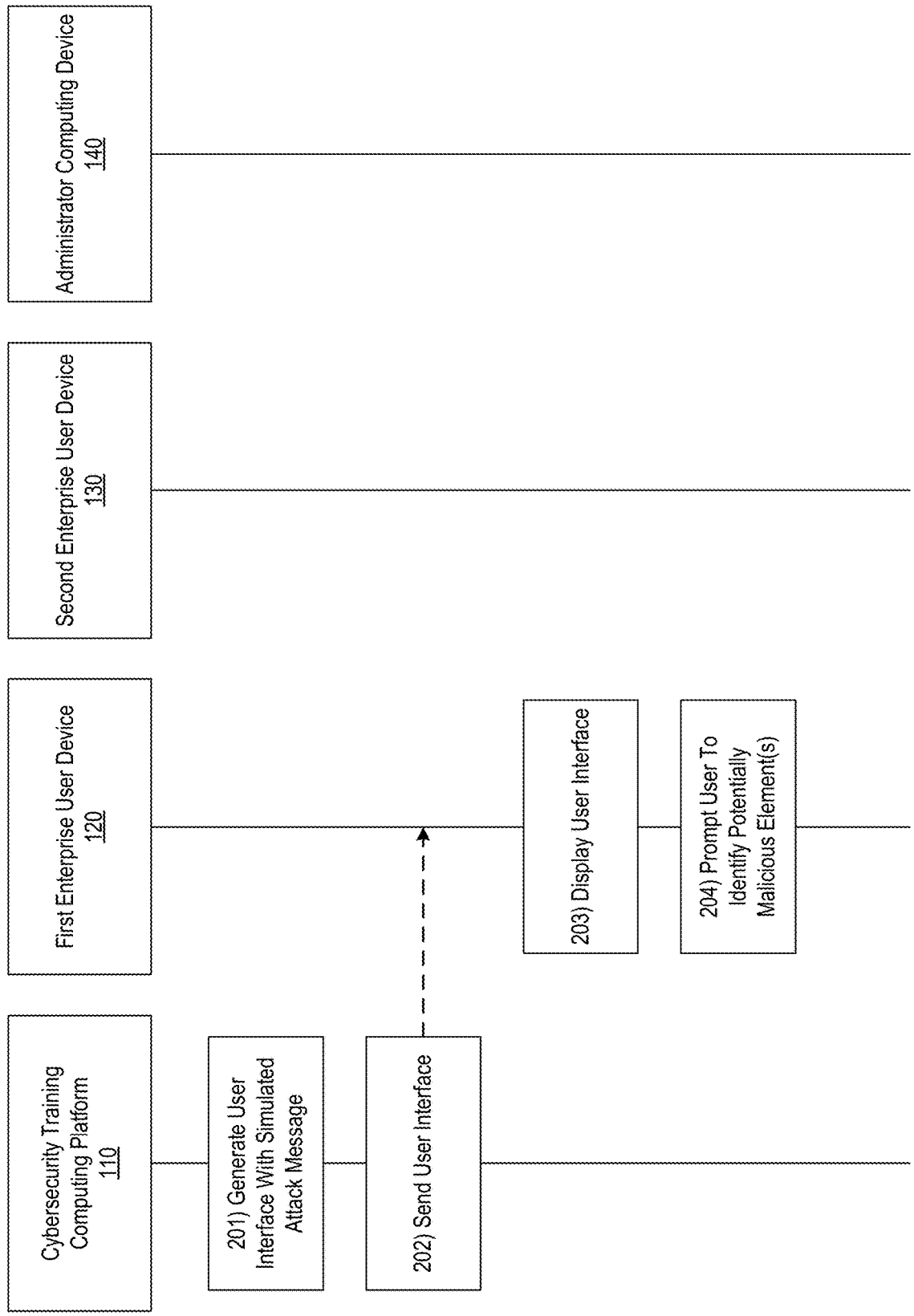
Figure 2D:
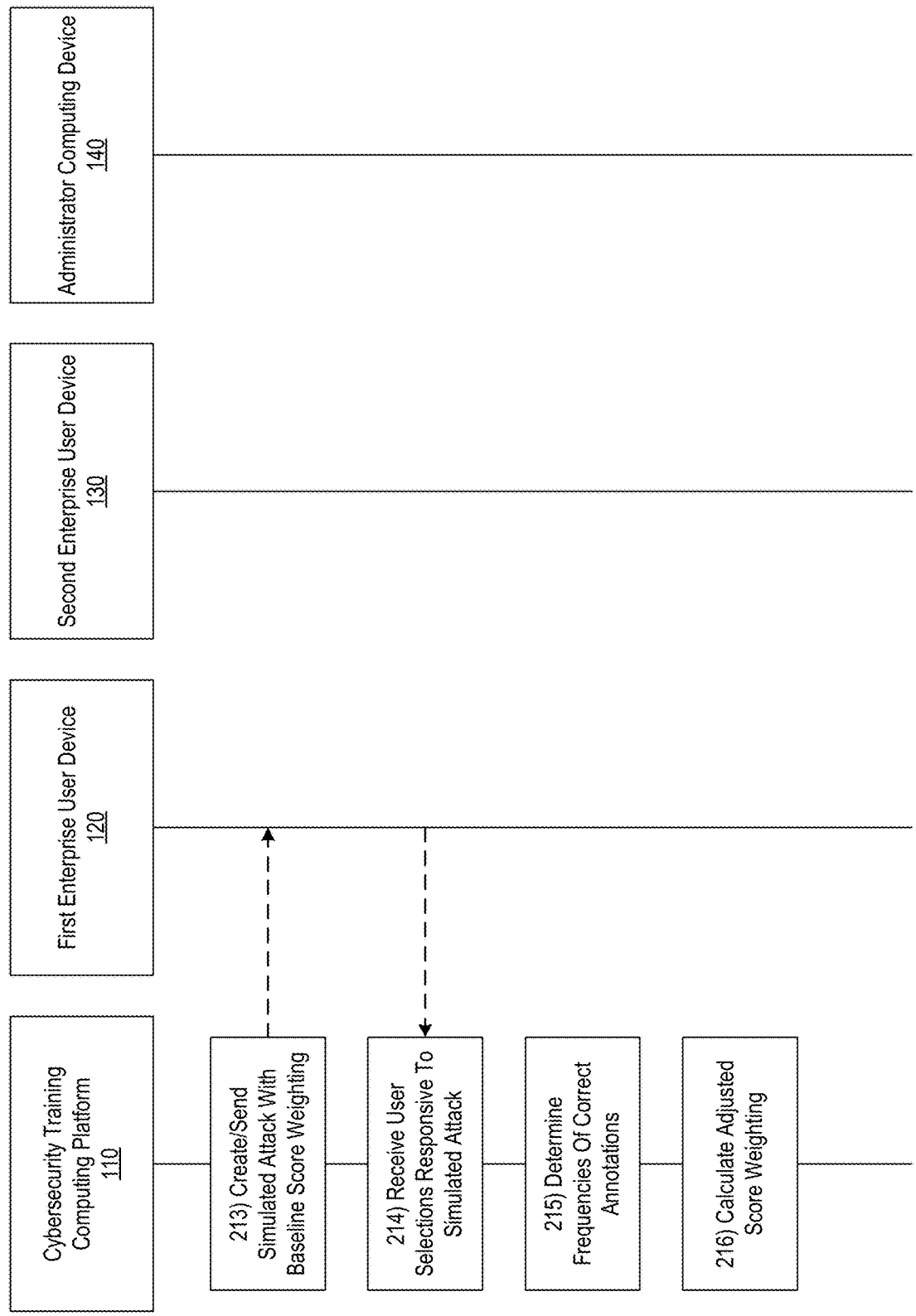
Figure 2F:
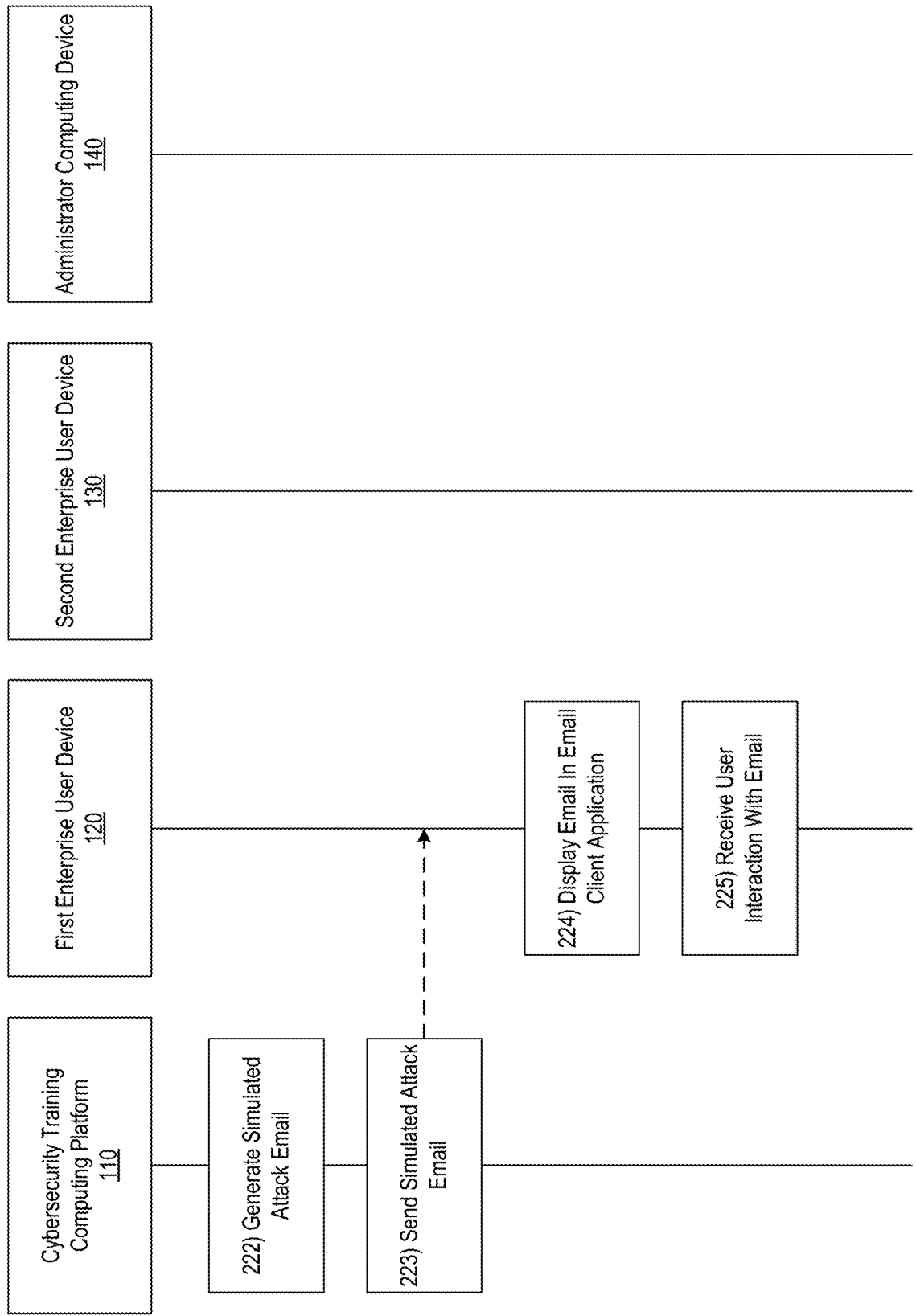
Figure 2G:
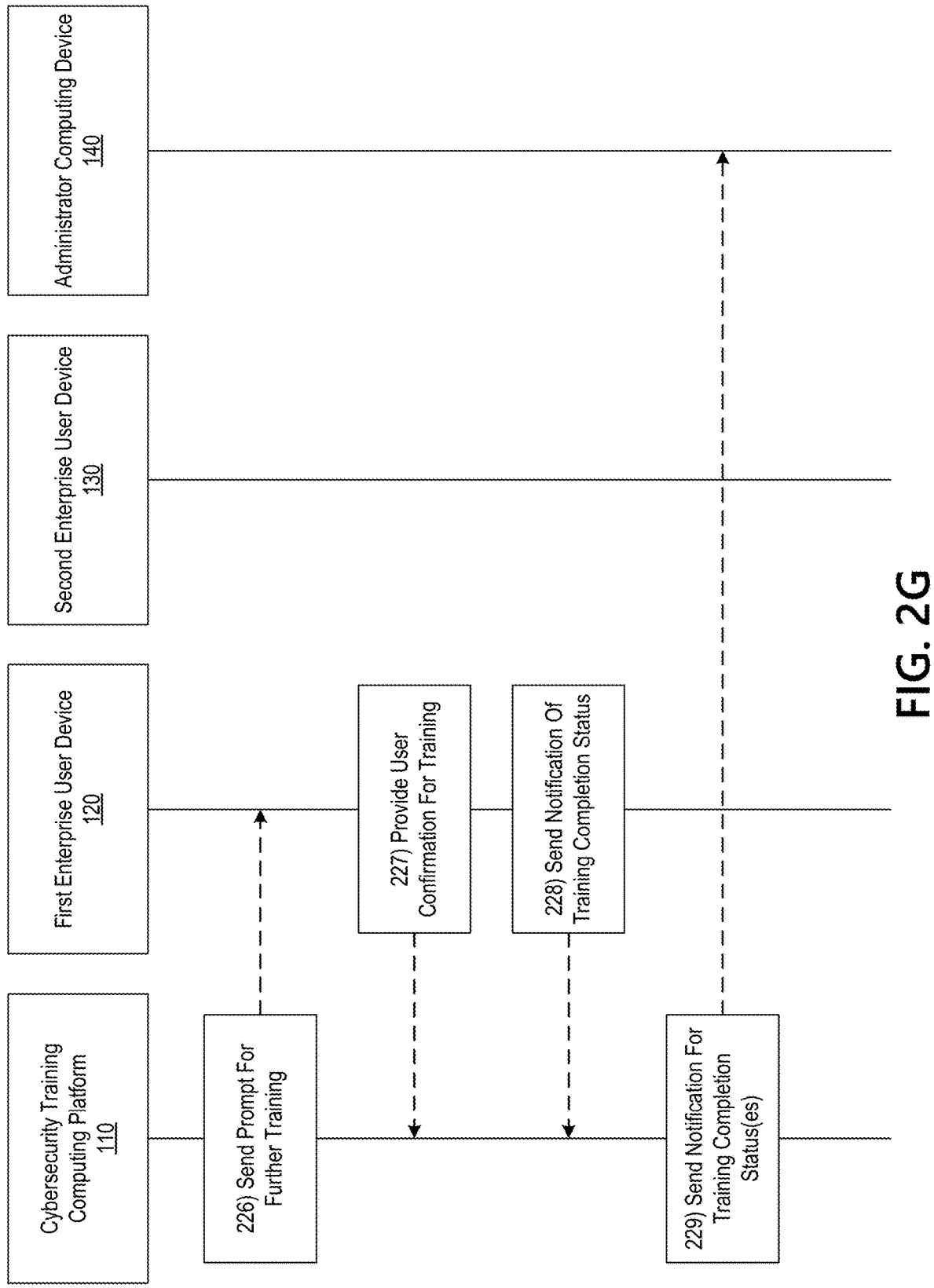
Figure 2H:
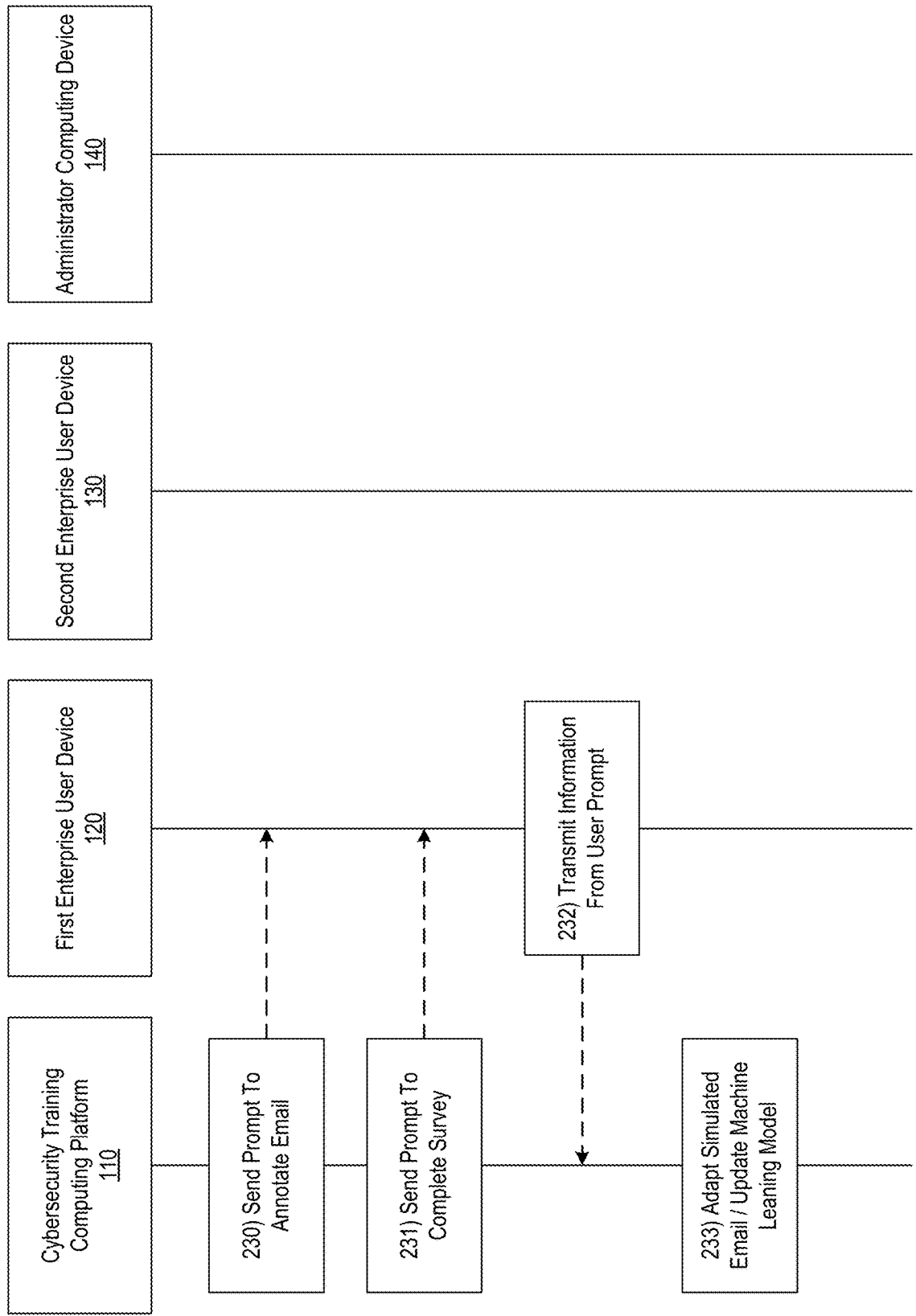

FIGS. 2A-2H depict an illustrative event sequence for dynamically generating simulated attack messages configured for annotation by users as part of cybersecurity training in accordance with one or more example embodiments. More particularly, FIGS. 2A-2C depict an illustrative event sequence for generating simulated attack messages configured for annotation by users as part of cybersecurity training in accordance with one or more example embodiments. FIG. 2D-2E depict an illustrative event sequence for computing score weighting as part of dynamically generating simulated attack messages configured for annotation by users as part of cybersecurity training in accordance with one or more example embodiments. FIG. 2F-2H depict an illustrative event sequence for dynamically generating simulated attack emails as part of cybersecurity training in accordance with one or more example embodiments.

Referring to FIG. 2A, at step 201, cybersecurity training computing platform 110 may generate a user interface that includes simulated attack message or a simulated attack email that includes threats in different regions. For example, at step 201, cybersecurity training computing platform 110 may generate a user interface with a simulated attack message that includes a plurality of potentially malicious elements. For example, the simulated attack message may include a plurality of potentially malicious elements in various different spatial regions and a plurality of non-malicious elements in a various other different spatial regions. In some instances, the plurality of elements may be include a number of text ranges or elements within the simulated attack message, that may change in the layout of the simulated attack message depending on the device and/or program displaying the simulated attacked message. In this regard, spatially-defined portions may refer to different portions of the simulated attack message for different users. In some instances, in generating the user interface at step 201, cybersecurity training computing platform 110 may generate both a training portal interface (which may, e.g., include one or more pages, annotation tools, and/or other elements) along with the simulated attack message, while in other instances, cybersecurity training computing platform 110 may generate only the simulated attack message itself (which may then, e.g., be provided to a user device for display within a locally executed training tool or other training interface).

At step 202, cybersecurity training computing platform 110 may send the user interface to first enterprise user device 120. The user interface may also be sent to one or more additional enterprise user devices, such as second enterprise user device 130. For example, at step 202, cybersecurity training computing platform 110 may send the user interface to a plurality of enterprise user devices, e.g., in accordance with facilitating an enterprise-wide cybersecurity training or a cybersecurity training for a selected group of users within an enterprise. As another example, at step 202, cybersecurity training computing platform 110 may send the user interface to a single enterprise user device, e.g., based on a determination that a user at a specified enterprise user device may benefit from a certain type of cybersecurity training and based on generating a user interface in accordance with that certain type of cybersecurity training.

Figure 3:
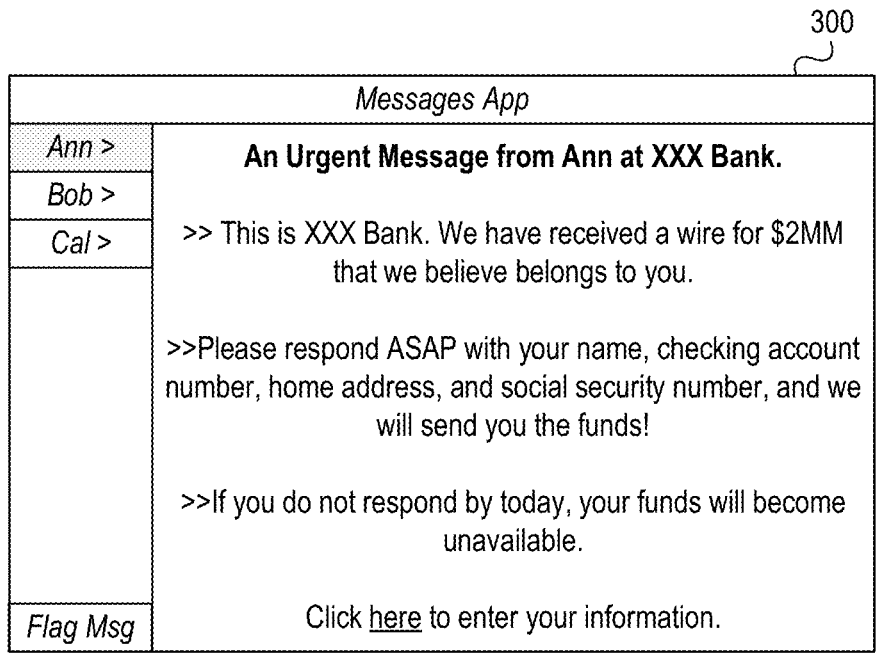

At step 203, the first enterprise user device 120 may display the user interface, e.g., in a cybersecurity training application or portal or in an email client application. For example, in some instances, in displaying the user interface, the first enterprise user device 120 may display a graphical user interface similar to graphical user interface 300, which is shown in FIG. 3. In this example, the simulated attack message may appear to be sent from a malicious email address, contain a malicious link, request personal information, and/or include one or more other indications that the initial simulated attack message is sent from a malicious actor.

At step 204, the first enterprise user device 120 may display a prompt to a user to identify one or more potentially malicious elements in the simulated attack message. For example, at step 204, after receiving and displaying the user interface that includes the simulated attack message, the first enterprise user device 120 may display a message with the prompt in a portion of the user interface. For example, in some instances, in displaying the prompt, the first enterprise user device 120 may display a graphical user interface similar to graphical user interface 500, which is shown in FIG. 5. In this example, the displayed prompt may include a message such as "Please Identify Malicious Elements."

Referring to FIG. 2B, at step 205, the first enterprise user device 120 may provide annotation tools to allow user to select regions of the user interface. For example, at step 205, the first enterprise user device 120 may modify one or more aspects of the user interface that includes the simulated attack message, e.g., to provide markers around or proximate to various elements of the simulated attack message, where such markers may signify to a user that an element is selectable. For example, in some instances, the first enterprise user device 120 may display a graphical user interface similar to graphical user interface 500, which is shown in FIG. 5. In this example, various elements are shown surrounded by dotted boxes, indicating that that such elements are selectable. In some examples, a tool may be provided that allows the user to select and annotate parts or elements of the simulated attack message. As an example, a highlighter tool may be provided that allows a user to select a color of the highlighter to indicate a threat level (e.g., green corresponds to good, yellow corresponds to a warning, red corresponds to a trap, and the like). In some examples, the graphical user interface may provide predefined areas for user selection with related instructions (e.g. "Select all the risky areas"). In some examples, the annotation tools may include one or more drop down menus that include various elements of the simulated attack message and/or various categories of malicious elements, such that a user may select one or more options from the drop down menus. Still in other examples, various other annotation tools may be used without departing from the scope of the present disclosure.

At step 206, the first enterprise user device 120 may receive one or more user selections via the annotation tools. For example, at step 206, the first enterprise user device 120 may receive one or more selections from interactions with the user interface identifying elements that a user indicates to be potentially malicious elements. The first enterprise user device 120 may also receive one or more selections of different types of malicious elements. For instance, some malicious elements may be categorized as "threats," e.g., links or other elements that the user can interact with which have some immediate effect on the user interface. Other malicious elements may be categorized as "red flag elements," e.g., suspicious elements that may signify that the message is potentially malicious, such as distorted graphics or threatening language. Accordingly, the first enterprise user device 120 may receive a selection of one or more elements of the simulated attack message that the user indicates as being potentially malicious, and/or a selection of one or more type of malicious elements categorizing the potentially malicious elements.

At step 207, the first enterprise user device 120 may transmit the one or more user selections to the cybersecurity training computing platform 110. For example, at step 207, each individual user selection interacting with the user interface may be sent to the cybersecurity training computing platform 110 in real-time (e.g., contemporaneously as such selection is being received by the first enterprise user device 120). In some examples, the first enterprise user device 120 may receive a series of user selections interacting with the user interface and then send the series of user interactions at step 207. The user selections transmitted at step 207 may include selections of one or more elements of the simulated attack message that the user indicated as being potentially malicious, and/or a selection of one or more types of malicious elements categorizing the potentially malicious elements. One or more additional components of information may be transmitted along with the one or more selections at step 207, such as the date and time at which the user selections were received at the first enterprise user device 120, user characteristics of the user associated with the first enterprise user device 120, a type or version of cybersecurity training application through which the user interface was displayed on the first enterprise user device 120, one or more descriptors of the simulated attack message, and the like.

In some embodiments, transmitting the user selections at step 207 may include recording and transmitting the cybersecurity training application session at the first enterprise user device 120 to provide the cybersecurity training computing platform 110 with additional information relating the user interaction with the simulated attack message. For example, by receiving the recorded cybersecurity training application session from the first enterprise user device 120, cybersecurity training computing platform 110 may obtain information relating to an order of selections, time intervals between different selections, user interactions with various elements of the simulated attack message, and the like. For instance, cybersecurity training computing platform 110 may analyze the recorded cybersecurity training application session to determine which portions of elements of the simulated attack message that the user noticed first, and/or which portions of the simulated attack message that went unnoticed. In addition, the first enterprise user device 120 may provide feedback relating to user input to the cybersecurity training computing platform 110, for instance, to report mouse input events (e.g., mouse hover events, selections, etc.), keyboard input events, and/or other input events from first enterprise user device 120.

In some instances, in receiving the user selections at step 207, cybersecurity training computing platform 110 may allow an analyst user or network administrator (e.g., a user of administrator computing device 140) to inspect the user selections being received by cybersecurity training computing platform 110 in real-time (e.g., contemporaneously as such content is being received by the cybersecurity training computing platform 110). Additionally or alternatively, cybersecurity training computing platform 110 may store a user-specific record of data received from the first enterprise user device 120 (as well as data received from other enterprise user devices), e.g., as the user of first enterprise user device 120 interacts with one or more simulated attack messages and/or completes one or more cybersecurity training modules in a cybersecurity training application. The user-specific record (which may, e.g., be maintained by cybersecurity training computing platform 110) may enable an analyst user or network administrator (e.g., a user of administrator computing device 140) to inspect the user's complete cybersecurity training record and/or experience with the cybersecurity training application. In some instances, cybersecurity training computing platform 110 may provide and/or integrate with an administrative dashboard portal so as to provide administrator computing device 140 and/or other devices (which may, e.g., be used by analyst users and/or network administrators) with access to user profile inspection functions, user-specific records, and/or other information associated with users interactions with the cybersecurity training application. For instance, via such a portal, cybersecurity training computing platform 110 may host and/or provide (e.g., to administrator computing device 140) information identifying how specific users interacted with the cybersecurity training application, information identifying specific training modules that one or more users have completed, information identifying specific training modules that have been recommended to one or more users, and/or other information as described in greater detail below.

At step 208, cybersecurity training computing platform 110 may calculate a user performance score based on the received user selections (and/or non-selections) interacting with the simulated attack message. For example, at step 208, based on the user selections (and/or non-selections), cybersecurity training computing platform 110 may calculate the user performance score based on totaling components that are correctly selected and/or correctly not selected by the user at the second enterprise user device in identifying potentially malicious components of the simulated attacked message. In some examples, the cybersecurity training computing platform 110 may apply a weighting in totaling each of the various components of the user performance score, where the weighting may be determined by a variety of factors, as described in greater detail below.

In some embodiments, calculating a user performance score at step 208, cybersecurity training computing platform 110 may employ one or more scoring algorithms, e.g., via performance score engine 112d. For instance, performance score engine 112d may use one or more machine-learning models to make a real-time determination as to a score of the simulated attack message and generation of a training module in accordance with the score. This approach may provide technical benefits and other advantages, because a cybersecurity training module may be dynamically adapted in real-time to suit a particular user.

Additionally or alternatively, in calculating a user performance score based on the user selections (and/or non-selections) at step 208, the cybersecurity training computing platform 110 may score a component of the user performance score based on a displayed, attached, or embedded URL string provided in the simulated attack message. For instance, cybersecurity training computing platform 110 may attribute a different score component to a user selection (or non-selection) of a displayed malicious URL string as opposed to an embedded URL string (e.g., that would require one or more additional steps by the user to view the actual URL string associated with a hyperlink). Still further, a differing score component may be applied for a URL string that is very clearly malicious as opposed to a URL string that is one or two characters off from a legitimate URL string. In some examples, the cybersecurity training computing platform 110 may generate a range of URL strings that are increasingly more difficult to identify as potentially malicious and may attribute more difficult URL strings with higher score components.

Additionally or alternatively, in calculating a user performance score based on the user selections (or non-selections) at step 208, cybersecurity training computing platform 110 may score a component of the user performance score based on one or more headers, header content and/or message body content of the simulated attack message. For instance, cybersecurity training computing platform 110 may attribute a different score component to a user selection (or non-selection) of such header content and/or message content based on how clearly malicious or how clearly legitimate that such content appears to be. Still further, a differing score component may be applied for content that is very clearly malicious (e.g., that asks for confidential user information and/or has a threatening message, such as "Enter your social security number here or you will lose all your money.") as opposed to content that appears relatively more legitimate but still has a malicious component (that asks for a user to click on a link to provide information, but the provide link is suspicious). In some examples, the cybersecurity training computing platform 110 may generate a range of header and/or message content items that are increasingly more difficult to identify as potentially malicious and may attribute more difficult header and/or message content with higher score components.

Additionally or alternatively, in calculating a user performance score based on the user selections (or non-selections) at step 208, cybersecurity training computing platform 110 may score a component of the user performance score based on a sender address or other sender content of the simulated attack message. For instance, cybersecurity training computing platform 110 may attribute a different score component to a user selection (or non-selection) of such a sender address of the simulated attack message based on how clearly malicious or how clearly legitimate that such content appears to be. For example, a differing score component may be applied for a sender address that is very clearly malicious (e.g., a sender address of scam@scam.com) as opposed to content that is one or two words or characters off from a legitimate sender address (e.g., a sender address of _____@AcmeHoldingz.com where a legitimate business name is Acme Holdings).

Subsequently, cybersecurity training computing platform 110 may perform one or more additional steps based on the calculated user performance score. For example, referring to FIG. 2C, at step 209, cybersecurity training computing platform 110 may determine one or more additional training areas for the user associated with the first enterprise user device 120. For instance, at step 209, cybersecurity training computing platform 110 may determine that a user may be particularly susceptible to messages that appear to be from a corporate authority, messages that promise a monetary or other prize, messages that indicate a password reset or other update, and the like. In other examples, at step 209, cybersecurity training computing platform 110 may determine that a user may be particularly susceptible to suspicious hyperlinks, suspicious sender addresses, suspicious message content, and the like.

In addition, in determining an additional training area for the user at step 209, cybersecurity training computing platform 110 may use a set of predefined scores and thresholds to determine a level of risk associated with the user based on the user performance score calculated by cybersecurity training computing platform 110 at step 208. For example, each selectable element of the user interface with the simulated attack message may correspond to a different component used in calculating the user performance score. After receiving the various selections interacting at the user interface with the simulated attack message at the first enterprise user device 120, cybersecurity training computing platform 110 may calculate portions of the overall user performance score corresponding to the various elements of the simulated attack message. Cybersecurity training computing platform 110 then may sum these score portions to determine an overall performance score for the user and may compare the overall performance score with one or more predetermined thresholds. For example, if the overall performance score exceeds a medium risk threshold but not a high risk threshold, cybersecurity training computing platform 110 may determine the user is associated with a "medium" risk. If the overall performance score exceeds both the medium risk threshold and the high risk threshold, cybersecurity training computing platform 110 may determine the user is associated with a "high" risk. If the overall score does not exceed the medium risk threshold or the high risk threshold, cybersecurity training computing platform 110 may determine the user is associated with a "low" risk. If, for instance, the cybersecurity training computing platform 110 determines the user to be associated with a "low" risk, cybersecurity training computing platform 110 may determine that no additional training areas are recommended for the user at that time. Alternatively, if the cybersecurity training computing platform 110 determines the user to be associated with a "medium" or "high" risk, cybersecurity training computing platform 110 may continue to step 210 to generate one or more training modules for the user, as illustrated below.

In some embodiments, determining the additional training areas for the user at first enterprise user device 120 may include determining that incorrectly selected or incorrectly unselected elements of the simulated attack message are associated with various element categories. For example, cybersecurity training computing platform 110 may categorize each of the incorrectly selected or unselected elements of the simulated attack message and determine a most common element category of the incorrectly selected or unselected element, or an element category associated with a higher risk exposure. In some examples, cybersecurity training computing platform 110 may determine a message category (e.g., personal message, business message, banking message, pornographic message, gambling message, etc.), for which the user may be more susceptible to a threat and use this category in determining additional training areas for the user as discussed above. In some instances, cybersecurity training computing platform 110 may determine one or more message categories associated with the simulated attack message by matching contents from the simulated attack message with information defined in one or more category templates maintained by cybersecurity training computing platform 110, such as a template for identifying personal messages, a template for identifying business messages, a template for identifying banking messages, a template for identifying pornographic messages, a template for identifying gambling messages, and so on. Additionally or alternatively, cybersecurity training computing platform 110 may execute one or more machine learning algorithms to determine a message category (e.g., personal message, business message, banking message, pornographic message, gambling message, etc.) for which the user may be more susceptible to a threat.

In some embodiments, determining one or more additional training areas for the user may include determining one or more user-specific risk factors associated with a user of the first enterprise user device 120. For example, in determining the one or more additional training areas for the user at step 209, cybersecurity training computing platform 110 may determine one or more user-specific risk factors associated with a user of the first enterprise user device 120, as discussed above. In some instances, cybersecurity training computing platform 110 may determine that certain elements of the simulated attack message are associated with a particular user-specific risk factors, and thus certain incorrectly selected or unselected elements may cause the cybersecurity training computing platform 110 to determine certain user-specific risk factor(s) associated with the incorrectly selected or unselected elements.

For example, cybersecurity training computing platform 110 may maintain and/or access information defining a group of "very susceptible persons" (who may, e.g., be enterprise users who are members of and/or otherwise associated with an enterprise organization operating cybersecurity training computing platform 110). In some instances, cybersecurity training computing platform 110 may dynamically score various enterprise users (e.g., based on the user performance score calculated at step 208), so as to dynamically add and/or remove specific users to and/or from the group of very susceptible persons (e.g., instead of using a static list of very susceptible persons) and/or otherwise update the group. In this way, cybersecurity training computing platform 110 may regularly and/or periodically reevaluate whether each user in the group of very susceptible persons continues to qualify as a very susceptible person and/or should continue to be included in the group (which may, e.g., be subject to receiving generated simulated attack messages at more frequent intervals that other groups of users). In some instances, cybersecurity training computing platform 110 may identify a particular user as a very susceptible person based on calculating a user performance score for the user and determining that the user performance score exceeds a predetermined threshold. As noted above, in some instances, a user who is classified as a high-risk user and/or who is a member of a very susceptible persons group may be subject to receiving simulated attack messages generated by cybersecurity training computing platform 110 more often. Additionally or alternatively, cybersecurity training computing platform 110 may include a user in the "very susceptible persons" group based on the user being included on a "very attacked persons" list that identifies users within an organization who are most at risk of cyberattacks because of their role or other factors.

In some embodiments, determining the one or more additional training areas may include identifying that a user of the first enterprise user device 120 is included in a "very susceptible persons" group associated with an enterprise organization. For example, in determining the one or more additional training areas at step 209, cybersecurity training computing platform 110 may identify that a user of the first enterprise user device 120 is included in a "very susceptible persons" group associated with the enterprise organization operating cybersecurity training computing platform 110. For instance, cybersecurity training computing platform 110 may maintain, access, and/or update information defining a group of "very susceptible persons" (who may, e.g., be enterprise users who are members of and/or otherwise associated with an enterprise organization operating cybersecurity training computing platform 110), as discussed above. In some instances, the users included in the group of very susceptible persons may be users who have relatively less seniority within the organization than other users, users who have previously fallen for actual phishing or other malicious messages, users who have previously scored low in one or more cybersecurity training modules, and/or users who are targeted more frequently by malicious actors than other users. In addition, if the user of the first enterprise user device 120 is included in this group, cybersecurity training computing platform 110 may determine to increase an amount or duration of cybersecurity training in determining the one or more additional training areas at step 209. In some instances, this increase may result in cybersecurity training computing platform 110 generating a customized training module specific to a "very susceptible persons" group, as discussed in greater detail below.

In some embodiments, determining the one or more additional training areas may include evaluating various factors associated with the user selections (or non-selections) received from the first enterprise user device 120. For example, in determining the one or more additional training areas at step 209, cybersecurity training computing platform 110 may separately evaluate each of elements of the simulated attack message and associate each of the elements with one or more factors. Based on associating each of the elements with such factors and evaluating the user selections (or non-selections) received from the first enterprise user device 120, cybersecurity training computing platform 110 may evaluate such factors as part of determining one or more additional training areas.

At step 210, cybersecurity training computing platform 110 may generate a training module based on the determined one or more additional training areas. For example, at step 210, cybersecurity training computing platform 110 may dynamically adapt a cybersecurity training module to include training aspects in accordance with each of the one or more additional training areas, e.g., using machine learning engine 112c. This may include modifying a preexisting training template to highlight and/or include questions that are relevant to the one or more additional training areas and/or to deemphasize and/or omit questions that are not relevant to the one or more additional training areas. As a result, cybersecurity training computing platform 110 may generate a training module specifically tailored to the user at the first enterprise user device 120.

For example, cybersecurity training computing platform 110 may determine a message category (e.g., personal message, business message, banking message, pornographic message, gambling message, etc.) for which the user may be more susceptible to a threat and use this category in determining one or more additional training areas for the user. Additionally or alternatively, cybersecurity training computing platform 110 may determine one or more risk factors associated with the user of the first enterprise user device 120 and use these user-specific risk factors in determining an additional training area for the user. For instance, cybersecurity training computing platform 110 may determine whether the user of the first enterprise user device 120 is a "very susceptible person" within an enterprise organization operating cybersecurity training computing platform 110 and/or otherwise a highly susceptible user (e.g., based on an enterprise-specific index of users), and this determination may correspond to a particular factor that is used by cybersecurity training computing platform 110 in determining an additional training area for the user, as discussed in greater detail below.

At step 211, cybersecurity training computing platform 110 may send the generated training module to first enterprise user device 120. For example, at step 211, cybersecurity training computing platform 110 may send the training module directly to the first enterprise user device 120 and/or may cause the training module to be sent to first enterprise user device 120 via a cybersecurity training application or portal.

At step 212, cybersecurity training computing platform 110 may aggregate user performance scores and/or user selections to simulated attack messages received from one or more enterprise user devices, such as the first enterprise user device 120, and send the aggregated information to the administrator computing device 140. For example, at step 212, the cybersecurity training computing platform 110 may aggregate user performance scores and/or user selections associated with an enterprise organization and/or groups of user within the enterprise organization. Administrator computing device 140 may be able to review and analyze the aggregated information to understand current cybersecurity susceptibility and/or training statuses of various users and/or groups of users across the enterprise organization.

Referring to FIGS. 2D-2E, an illustrative event sequence for computing score weighting as part of dynamically generating simulated attack messages configured for annotation by users is depicted. At step 213, cybersecurity training computing platform 110 may create a simulated attack message with a baseline score weighting, e.g., where all elements are scored equally, and may send the simulated attack message to various enterprise user devices, such as the first enterprise user device 120. For example, at step 213, cybersecurity training computing platform 110 may create and send the simulated attack message in a similar manner to that described for steps 201 and 202 of FIG. 2A. Various techniques may be employed in assigning the baseline score weighting to the simulated attack message. In some instances, all elements of the simulated attack message may be weighted equally. In some instances, elements in the simulated attack message may be weighted based on an estimated difficulty associated with each elements. In some instances, the elements of the simulated attack message may be attributed with a baseline weighting that takes into consideration that potential risk associated with a user falling for the potentially malicious element.

At step 214, cybersecurity training computing platform 110 may receive user selections responsive to the simulated attack message from various enterprise user devices, such as the first enterprise user device 120. For example, the user selections received at step 214 may be received in a similar manner to that described with respect to steps 203 through 207 of FIGS. 2A-2B.

At step 215, cybersecurity training computing platform 110 may determine a frequency with which elements of the simulated attack message are correctly annotated (or incorrectly annotated) by various enterprise user devices, such as the first enterprise user device 120. For example, at step 215, a determined frequency for an element may be associated with the frequency with which various users interacted with the same element (or a similar element) within the simulated attack message, e.g., by selecting the element as a potentially malicious element.

At step 216, cybersecurity training computing platform 110 may calculate an adjusted score weighting for one or more elements of the simulated attack message (e.g., based on determining frequency with which element are correctly or incorrectly annotated at step 215). For example, at step 216, based on determining that an element has a very low frequency of being correctly annotated by various users, cybersecurity training computing platform 110 may calculate an adjusted score weighting for that element in view of the very low frequency of correct annotation. For instance, cybersecurity training computing platform 110 may determine that elements for low frequencies of correct annotation are overly difficult to most enterprise users and may therefore calculate a lower adjusted score weighting for such elements. In other instances, cybersecurity training computing platform 110 may determine that elements for low frequencies of correct annotation are indicative of a more "master level" detection by enterprise users and may therefore calculate a higher adjusted score weighting for such elements, e.g., such that only "master level" enterprise users who correctly detect such elements are able to achieve performance scores above a certain "master level" threshold.

Subsequently, cybersecurity training computing platform 110 may calculate user performance scores using the adjusted score weighting calculated at step 216. Still further, the cybersecurity training computing platform 110 may generate new simulated attack messages and/or may dynamically adapt existing simulated attack messages in accordance with the information obtained as part of steps 213 through 216. For example, the cybersecurity training computing platform 110 may dynamically adapt an existing simulated attack message to remove one or more elements associated with correct annotations being above or below a specified threshold. As another example, cybersecurity training computing platform 110 may generate a new simulated attack message comprised of a plurality of elements, where the elements are associated with score weightings based on previously received user selections, e.g., such that the total score for the simulated attack message totals to a specified total score range. As another example, cybersecurity training computing platform 110 may dynamically adapt an existing simulated attack message to modify one or more element (e.g., to have lower or high associated difficulties) in accordance with information based on previously received user selections.

Referring to FIG. 2E, at step 217, the cybersecurity training computing platform 110 may receive user selections (or non-selections) responsive to the simulated attack message from various enterprise user devices, such as the second enterprise user device 130. For example, the user selections received at step 217 may be received in a similar manner to that described with respect to step 214 of FIG. 2D, and/or steps 203 through 207 of FIGS. 2A-2B. At step 218, the cybersecurity training computing platform 110 and/or the performance score engine 112d may calculate a user performance score for the user at the second enterprise user device 130 based on the user selections (or non-selections) received at step 217 and based on the adjusted score weighting for the one or more elements of the simulated attack message calculated at step 218. In that regard, the performance score engine 112d and/or the cybersecurity training computing platform 110 may track the various score weighting associated with the elements of a simulated attack message and may associate a given user performance score with the applicable score weightings of the simulated attack message.

At step 219, the cybersecurity training computing platform 110 may update the frequency with which elements of the simulated attack message are correctly annotated (or incorrectly annotated) by various enterprise user devices, such as the second enterprise user device 130. For example, at step 219, the determined frequency for one or more elements of the simulated attack message may be updated based on the user selections (or non-selections) received from the second enterprise user device 130 at step 217. The cybersecurity training computing platform 110 may calculate or update frequency correct or incorrect annotation of each element at step 219 in a similar manner as step 215.

At step 220, the cybersecurity training computing platform 110 may calculate an adjusted score weighting for one or more elements of the simulated attack message, e.g., that includes frequency with which elements are correctly or incorrectly annotated by the user at the second enterprise user device 130 form step 219. The cybersecurity training computing platform 110 may calculate an adjusted score weighting of each element at step 220 in a similar manner as step 216.

Subsequently, at step 221, the cybersecurity training computing platform 110 may continue to monitor one or more enterprise user devices for additional user selections responsive to user interactions with the simulated attack message. The additional user selections may be received from new enterprise user devices (e.g., enterprise user devices which have not yet previously provided user selection information relating to the simulated attack message). In some instances, the additional user selections may be received from the first enterprise user device 120 and/or the second enterprise user device 130, e.g., if a user has opted to or has been prompted to review and annotate the simulated attack message again, at a later time. Upon receiving such additional user selections, the cybersecurity training computing platform 110 may repeat steps 218-220 based on the newly received user selections. In this manner, the cybersecurity training computing platform 110 may continue to refine the scoring model, e.g., using the performance score engine 112d, for simulated attack message. Still further, the cybersecurity training computing platform 110 may continue to dynamically generate and/or adapt simulated attack messages based on the information received from one or more enterprise user devices so as to better tailor cybersecurity training and assessments to users of an enterprise organization.

Referring to FIGS. 2F-2H, an illustrative event sequence for simulated attack emails as part of cybersecurity training is depicted. Referring to FIG. 2F, at step 222, cybersecurity training computing platform 110 may generate a simulated attack email that includes threats in different regions. For example, at step 222, cybersecurity training computing platform 110 may generate a simulated attack email that includes a plurality of potentially malicious elements in various different spatial regions and a plurality of non-malicious elements in various other different spatial regions. The cybersecurity training computing platform 110 may generate the simulated attack email in a similar manner to the simulated attack message generated at step 222.

At step 223, cybersecurity training computing platform 110 may send the simulated attack email to first enterprise user device 120. In some instances, at step 223, the cybersecurity training computing platform 110 may send the simulated attack email to an email server, e.g., associated with the enterprise organization, which then sends the simulated attack email on to the first enterprise user device. In some examples, the simulated attack email may also be sent to one or more additional enterprise user devices, such as second enterprise user device 130. For example, at step 223, cybersecurity training computing platform 110 may send the simulated attack email to a plurality of enterprise user devices, e.g., in accordance with facilitating an enterprise-wide cybersecurity training program or a cybersecurity training for a selected group of users within an enterprise. As another example, at step 223, cybersecurity training computing platform 110 may send the simulated attack email to a single enterprise user device, e.g., based on a determination that a user at a specified enterprise user device may be susceptible to a certain type of cybersecurity threat, based on a determination that the user has not completed a cybersecurity training program is a specified time period, and the like.

At step 224, the first enterprise user device 120 may display the simulated attack email, e.g., in an email client application. For example, in some instances, in displaying the simulated attack email, the first enterprise user device 120 may display a graphical user interface similar to graphical user interface 300, which is shown in FIG. 3. The simulated attack email may appear to be sent from a malicious email address, contain a malicious link, request personal information, and/or include one or more other indications that the initial simulated attack message is sent from a malicious actor, e.g., in a similar manner to that described for display the user interface at step 203.

As an example, in displaying the simulated attack email in an email client application at step 224, cybersecurity training computing platform 110 may cause first enterprise user device 120 to generate, display, and/or otherwise present a graphical user interface similar to graphical user interface 300, which is illustrated in FIG. 3. As seen in FIG. 3, graphical user interface 300 may include a list of new (e.g., unread) mails in an email client application including the simulated attack email (e.g., "An Urgent Message from Anne at XXX Bank . . . ") as well as message content of the simulated attacked email. The message content of the simulated attack message may include one or more elements that may indicate to the user that the email is potentially malicious (e.g., elements that request entry of confidential information, elements that include a suspicious hyperlink, elements that include a threat if certain action is not taken, and the like). The graphical user interface 300 may also include a selectable option to flag one or more emails as potentially malicious, suspicious, or as spam (e.g., "Flag Msg."). In such examples, enterprise users may be advised to use the selectable option to flag potentially malicious messages at any time that such messages are received (e.g., including outside of the cybersecurity training context).

Figure 4:
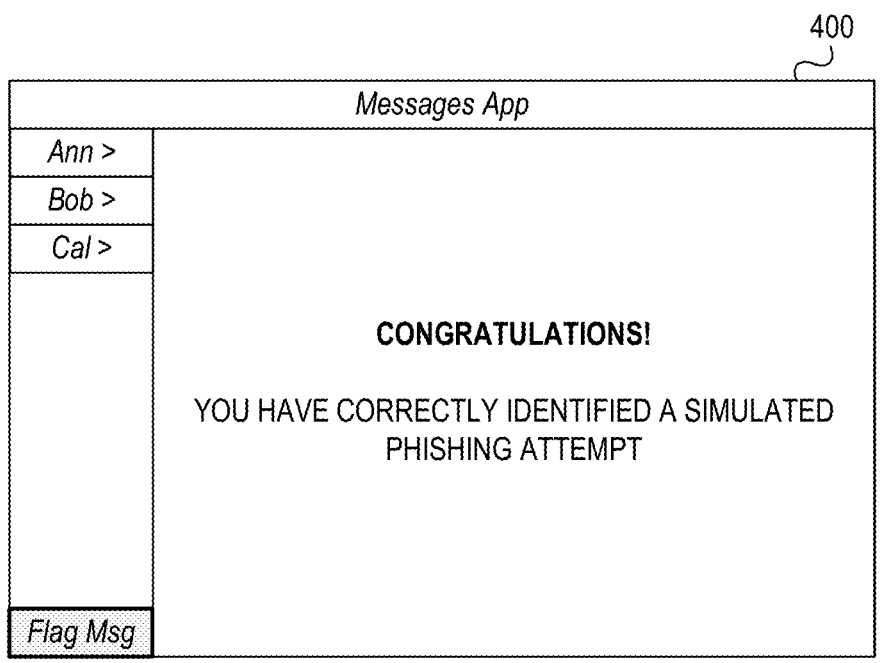

At step 225, the first enterprise user device 120 may receive one or more user interactions with the simulated attack email, e.g., falling for the simulated attack, or providing an indication that the email appears to be suspicious. For example, in receiving the user interaction with the simulated attack email at step 225, cybersecurity training computing platform 110 may cause the first enterprise user computing device 120 to generate, display, and/or otherwise present one or more graphical user interfaces which may, e.g., indicate that the user correctly flagged the simulated attack email as a potentially malicious email (e.g., graphical user interface 400 of FIG. 4) or indicate that the user fell for the simulated attack email (e.g., graphical user interface 600 of FIG. 6). As shown in FIG. 6, graphical user interface 600 may include a notification indicating that that the simulated attack email was generated as a test (e.g., "You just fell for a simulated phishing message that we generated as a test."), a warning of the potential risks real messages (e.g., "Interacting with a phishing message may be dangerous to both personal and enterprise security.") and a prompt to complete cybersecurity training (e.g., "Please click below to begin a module on phishing awareness and management."). Graphical user interface 600 and/or graphical user interface 400 may include a link to begin a specified cybersecurity training module, as will be described in greater detail below.

Referring to FIG. 2G, at step 226, cybersecurity training computing platform 110 may send a prompt to the first enterprise user device 120 for further training if the user fell for the simulated attack email per the interaction received at step 225. For example, graphical user interface 600 may include a link to begin a specified cybersecurity training module. The specified cybersecurity training module may be determined based on determining one or more additional training areas for the user and generating a cybersecurity training module in a similar manner to that described for steps 209 and 210.

Subsequently, at step 227, the cybersecurity training computing platform 110 may receive confirmation from the first enterprise user device 120 that the user will take the cybersecurity training module via the prompt sent at step 226. In some examples, at step 227, the cybersecurity training computing platform 110 may receive an indication that the user at the first enterprise user device 120 has declined or postponed the cybersecurity training module, e.g., where the prompt sent at step 226 may allow the user to interact with the prompt in a variety of ways, such as selecting to start the cybersecurity training module, to snooze the notification, to postpone the cybersecurity training module until a specified later time, to decline to take the cybersecurity training module, and the like.

At step 228, the cybersecurity training computing platform 110 may receive a notification that the user at the first enterprise user device 120 has completed the cybersecurity training module. In other examples, at step 228, the cybersecurity training computing platform 110 may receive a notification that the user at the first enterprise user device 120 has not completed the cybersecurity training module, e.g., after a specified time period has elapsed, or upon the user interacting with the prompt sent at step 226 to indicate that the user has declined to take the cybersecurity training module.

At step 229, the cybersecurity training computing platform 110 may transmit a notification to the administrator computing device 140 indicating whether or not the user at the first enterprise user device has completed the cybersecurity training module based on the notification provided at step 228 and/or how the user interacted with the simulated attack email, based on the information received at step 225. In some examples, at step 229, the cybersecurity training computing platform 110 may aggregate information received (e.g., user interactions with a simulated attack email and/or notifications relating to completion of one or more cybersecurity training modules) from one or more enterprise user devices associated with an enterprise organization and/or groups of users within an enterprise organization. Administrator computing device 140 may be able to review and analyze the aggregated information to understand current cybersecurity susceptibility and/or training statuses of various users and/or groups of users across the enterprise organization Referring to FIG. 2H, at step 230, if the user at the first enterprise user device 120 correctly indicated that the simulated attack email appear suspicious (e.g., by selecting the "Flag Msg" icon in the graphical user interface 300 of FIG. 3), the cybersecurity training computing platform 110 may send a prompt to the first enterprise user device 120 for the user to annotate portions of the simulated attack email that appear to be suspicious. In some instances, in displaying the prompt, the first enterprise user device 120 may display a graphical user interface similar to graphical user interface 500, which is shown in FIG. 5. In this example, the displayed prompt may include a message such as "Please Identify Malicious Elements." The user at the first enterprise user device 120 may then interact with the simulated attack email using one or more annotations tools, similar to as described in steps 205 and 206. For example, as shown in the graphical user interface 500 of FIG. 5 dotted lines are shown surrounding various elements in the simulated attack email, indicating to the user that the various dotted lines represent selectable elements in the simulated attack email At step 231, if the user at the first enterprise user device 120 correctly indicated that the simulated attack email appear suspicious (e.g., by selecting the "Flag Msg" icon in the graphical user interface 300 of FIG. 3), the cybersecurity training computing platform 110 may send a prompt to the first enterprise user device 120 for the user to complete a cybersecurity survey. For example, the survey may include questions such as: "We see that you fell for this simulated attack email. What elements of were persuasive that led you to fall for it?" and/or additional questions to gauge potential areas in which the user may be particularly susceptible to a malicious attack.

At step 232, the first enterprise user device 120 may transmit the information from the user prompts (e.g., one or more user selections annotated portions of the simulated attack email in response to the prompt sent at step 230 and/or one or more survey responses in response to the prompt sent at step 231) to the cybersecurity training computing platform 110. The information may be transmitted to the cybersecurity training computing platform 110 in a similar manner as that described for step 207.

Subsequently, at step 233, the cybersecurity training computing platform 110 may determine which elements of the simulated attack email are effective (e.g., based on aggregate user selections or interactions from a plurality of enterprise user devices). For example, at step 233, the cybersecurity training computing platform 110 may dynamically adapt the simulated attack email based on the aggregated information received from one or more enterprise user devices and/or update machine learning models used in generating simulated attack messages or email using machine learning engine 112c.

As noted above, cybersecurity training computing platform 110 may, in some instances, select and/or use different models in generating and/or dynamically adapting simulated attack messages. In addition, cybersecurity training computing platform 110 (and/or machine learning engine 112c) may be dynamically adapting and generating new cybersecurity training modules and/or simulated attack messages based on previously received user selection information, the cybersecurity training computing platform 110 may be able to tailor various cybersecurity training programs to the needs of one or more users or groups of users within an enterprise organization. The ability to dynamically tailor such cybersecurity training programs may provide one or more technical advantages over conventional approaches in which the same training is applied to each user regardless of a user's susceptibility to cybersecurity threats. Moreover, cybersecurity training computing platform 110 may, in some instances, apply one or more rules that were trained and/or learned by cybersecurity training computing platform 110 in generating simulated attack messages across different groups of users. For instance, cybersecurity training computing platform 110 may apply one or more machine-learned rules for dynamically generating and adapting cybersecurity training modules based on analyzing user selections or interactions with simulated attack messages.

For instance, cybersecurity training computing platform 110 may apply one or more machine-learned rules for dynamically generating and adapting cybersecurity training modules based on analyzing user selections or interactions with simulated attack messages. The cybersecurity training computing platform 110 may also apply one or more machine-learned rules for generating simulated attack messages and/or score weightings for elements within a simulated attack message based on previously received user selections or interaction with other (e.g., similar) simulated attack messages.

In some instances, cybersecurity training computing platform 110 may utilize one or more optimization rules for implementing one or more cybersecurity training programs. Such optimization rules may, for instance, define different policies for generating one or more simulated attack messages for different members of different enterprise user groups. For example, users who are members of a senior management user group within an enterprise organization may be assigned to a cybersecurity training and/or a simulated attack message generated by the cybersecurity training computing platform 110 that has a higher level of difficulty than other users. Advantageously, such optimization rules may, for selected user groups, provide cybersecurity training programs better tailored to the selected user groups, than might otherwise be the case, e.g., when implementing the same cybersecurity training for all users across an enterprise organization regardless of the user or the user's actual susceptibility to a potential cyber-attack. In this way, such optimization rules may increase the overall effectiveness of cybersecurity training computing platform 110 for various users. Additionally the annotation tools and/or the scoring mechanism may provide a gamification element to cybersecurity training programs, which may result in such cybersecurity training programs being more appealing for users to complete.

Figure 7:
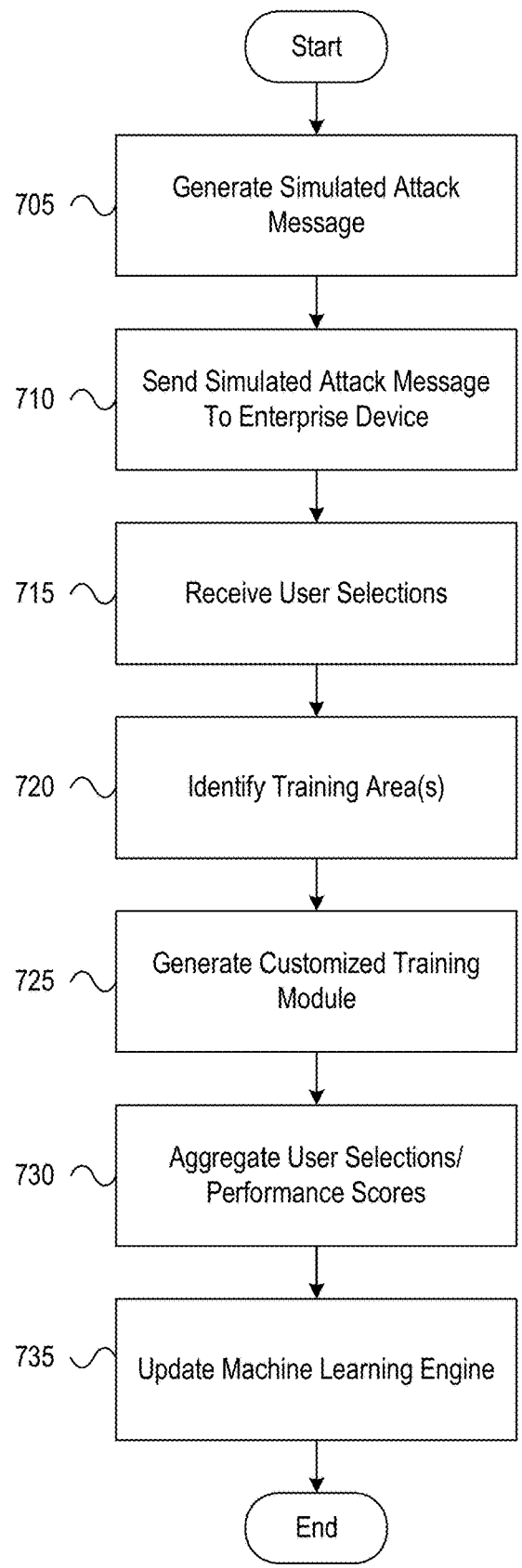
FIG. 7 depicts an illustrative method for dynamically generating simulated attack messages configured for annotation by users as part of cybersecurity training in accordance with one or more example embodiments.

FIG. 7 depicts an illustrative method for dynamically generating simulated attack messages configured for annotation by users as part of cybersecurity training in accordance with one or more example embodiments. Referring to FIG. 7, at step 705, a computing platform having at least one processor, a communication interface, and memory may generate a simulated attack message, where the simulated attack message may include a plurality of elements. In some instances, the plurality of elements may be located in different spatial portions of the simulated attack message. In some instances, the plurality of elements may be include a number of text ranges or elements within the simulated attack message, that may change in the layout of the simulated attack message depending on the device and/or program displaying the simulated attacked message. In this regard, spatially-defined portions may refer to different portions of the simulated attack message for different users. At step 710, the computing platform may send the simulated attack message to one or more enterprise user devices. Sending the simulated attack message at step 710 may include displaying the simulated attack message in a cybersecurity training application or portal.

At step 715, in response to simulated attack message, the computing platform may receive one or more user selections from one or more enterprise user devices interacting with the simulated attack message displayed thereon. The user selections received may include one or more user selections annotating selected elements of the plurality of elements in the simulated attack message. In some examples, the user selections annotating selected elements of the plurality of elements of the simulated attack message may be received responsive to displaying a prompt at the enterprise user device to identify one or more potentially malicious elements of the simulated attack message. The user selections annotating selected elements of the plurality of elements of the simulated attack message may be received responsive to providing, at the enterprise user device, one or more annotation tools to allow user selections of elements of the simulated attack message. In some examples, the user selections annotating selected elements of the plurality of elements of the simulated attack message may be received responsive to displaying the simulated attack message in an email client application, and an initial user selection may include an interaction with the simulated attack message indicating that the simulated attack message has been marked as potentially suspicious or indicating that a user at the enterprise user device fell for the simulated attacked message. The computing platform may also receive additional user selections categorizing the selected elements from a list of type of malicious elements.

At step 720, based on the one or more user selections received from the one or more enterprise user devices, the computing platform may identify one or more additional training areas for a user. Identifying the one or more additional training areas for the user may include calculating a user performance score based on the user selections. The user performance score may include a first score component based on portions of the simulated attack message correctly selected and a second score components based on portions of the simulated attack message correctly not selected. In some examples, the user selections annotating selected elements of the plurality of elements of the simulated attack message received at step 720 may be received responsive to displaying a prompt at the enterprise user device to identify one or more potentially malicious elements of the simulated attack message. The user selections annotating selected elements of the plurality of elements of the simulated attack message may be received responsive to providing, at the enterprise user device, one or more annotation tools to allow user selections of elements of the simulated attack message.

At step 725, the computing platform may generate a customized training module specific to the identified one or more additional training areas for the user, and may send the customized training module to the enterprise user device associated with the user. Sending the customized training module to the enterprise user device may cause the enterprise user device to display the customized training module. At step 730, the computing platform may aggregate a plurality of user selections interacting with the simulated attack message and/or a plurality of user performance score calculated based on interactions with the simulated attack message. Using the aggregated information, the computing platform may update the machine learning engine. The aggregated user selections and/or user performance score may subsequently be transmitted to an administrator computing device.

Figure 8:
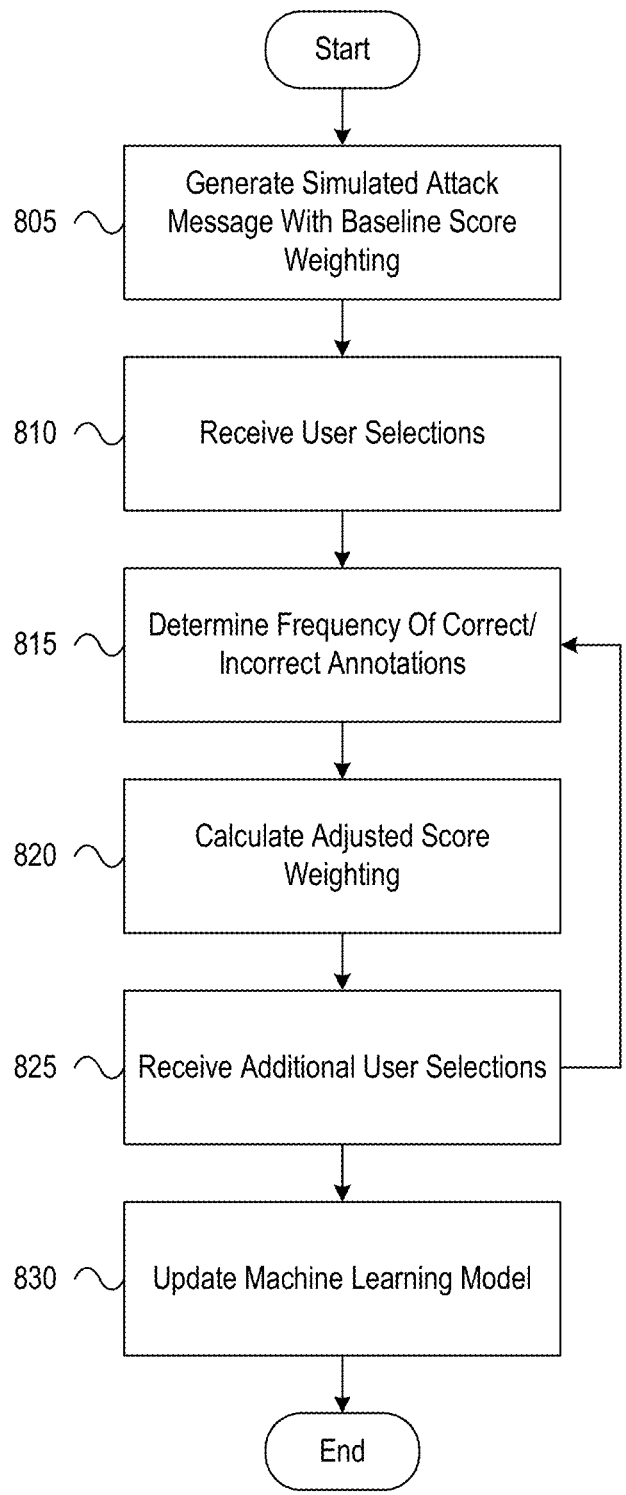
FIG. 8 depicts another illustrative method for dynamically generating simulated attack messages configured for annotation by users as part of cybersecurity training in accordance with one or more example embodiments.

FIG. 8 depicts another illustrative method for dynamically generating simulated attack messages configured for annotation by users as part of cybersecurity training in accordance with one or more example embodiments. Referring to FIG. 8, at step 805, a computing platform having at least one processor, a communication interface, and memory may generate a simulated attack message with a baseline score weighting for each element. For example, at step 805, cybersecurity training computing platform 110 may, via performance score engine 112*d*, generate the simulated attack message with a plurality of elements in different portions of the simulated attack message and may assign a baseline score weighting to each element of the plurality of elements. The computing platform may then send the simulated attack message having the baseline score weighting to one or more enterprise user devices, e.g., in a cybersecurity training application or portal, or in an email client application.

At step 810, in response to simulated attack message, the computing platform may receive one or more user selections from one or more enterprise user devices interacting with the simulated attack message. The user selections received may include one or more user selections annotating selected elements of the plurality of elements in the simulated attack message. In some examples, the user selections annotating selected elements of the plurality of elements of the simulated attack message may be received responsive to displaying a prompt at the enterprise user device to identify one or more potentially malicious elements of the simulated attack message. The user selections annotating selected elements of the plurality of elements of the simulated attack message may be received responsive to providing, at the enterprise user device, one or more annotation tools to allow user selections of elements of the simulated attack message. In some examples, the user selections annotating selected elements of the plurality of elements of the simulated attack message may be received responsive to displaying the simulated attack message in an email client application, and an initial user selection may include an interaction with the simulated attack message indicating that the simulated attack message has been marked as potentially suspicious or indicating that a user at the enterprise user device fell for the simulated attacked message. The computing platform may also receive additional user selections categorizing the selected elements from a list of type of malicious elements.

At step 815, the computing platform may determine the frequency of correct annotations and/or incorrect annotations based on the received one or more user selections from one or more enterprise user devices interacting with the simulated attack message. For example, at step 815, the computing platform may compute a frequency with each element of the plurality of elements of the simulated attack message are correctly selected by users.

At step 820, the computing platform may calculate an adjusted score weighting for one or more of the elements of the plurality of elements of the simulated attack message. The adjusted score weighting may replace the baseline score weighting for an associated element. For example, at step 820, cybersecurity training computing platform 110 may, via performance score engine 112*d*, assign an adjusted score weighting for each element of the plurality of elements based on the computed frequency with which elements are correctly selected by users. For instance, the computing platform may calculate an adjusted score weighting for each element and may replace the baseline score weighting with the adjusted score weighting for a respective element, e.g., to be used in calculating user performance scores in interacting with the simulated attack message. In some examples, the computing platform may calculate a user performance score based on the user selections and the adjusted score weighting for each element, and may subsequently identify one or more training areas for the user based on the calculated user performance score.

Subsequently, at step 825, the computing platform may receive one or more additional user selections from one or more enterprise user devices interacting with the simulated attack message. The one or more additional user selections received at step 825 may be received from different enterprise user devices than the enterprise devices from which user selections were received at step 810. In some examples, at least some of the one or more additional user selections received at step 825 may be received from the same enterprise user devices as the enterprise devices from which user selections were received at step 810, e.g., based on re-sending the simulated attack message to the enterprise user device at a predefined later time. Still further, the one or more additional user selections received at step 825 may be received from one or more different user accounts than the user account from which user selections were received at step 810. In other examples, the one or more additional user selections received at step 825 may be received from one or more of the same user account as the user account from which user selections were received at step 810, e.g., to verify if a user's susceptibility to an attack message has changed at a predefined later time. The one or more additional user selections at step 825 may be received in a similar manner as that described for the one or more user selections received at step 810, e.g., to include one or more user selections annotating selected elements of the plurality of elements in the simulated attack message, that are received responsive to displaying a prompt at the enterprise user device to identify one or more potentially malicious elements of the simulated attack message, and/or received responsive to providing, at the enterprise user device, one or more annotation tools to allow user selections of elements of the simulated attack message.

Subsequently, after receiving the one or more additional user selections from one or more enterprise user devices interacting with the simulated attack message at step 825, the computing platform may repeat steps 815, 820, and/or 825 to continue to refine the score weighting of the simulated attack message. At step 830, the computing platform may update the machine learning model based on the received user selections (e.g., the one or more user selections received at step 810 and/or the one or more additional user selections received at step 825). The computing platform may, via the machine learning engine 112c, update the machine learning model used to dynamically generate and/ or adapt simulated attack messages and score weightings of elements of the simulated attack messages. In some examples, the computing platform may, via the machine learning engine 112c, update the machine learning model used to dynamically generate and/or adapt cybersecurity training modules and/or determined areas of training for users based on received user selections interacting with the simulated attack messages. In some examples, at step 830, the computing platform may update a machine learning model used in generating the simulated attack message based on, e.g., the computed frequency with which elements are correctly selected by users determined at step 815 and/or the computed adjusted score weighting calculated at step 820.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface; and
   memory storing computer-readable instructions that, when executed by the at least one processor, cause the computing platform to:
      generate an electronic communication including a simulated attack message;
      send, to an enterprise user device, the simulated attack message, wherein sending the simulated attack message causes the enterprise user device to interactively display a simulated attack interface comprising a plurality of interactive elements;
      receive, from the enterprise user device, user selections annotating selected elements of the plurality of interactive elements of the simulated attack message, wherein receiving the user selections annotating selected elements of the plurality of interactive elements of the simulated attack message includes receiving markers proximate the selected elements dynamically modifying the simulated attack interface;

identify one or more training areas for a user based on the user selections received from the enterprise user device;

generate a customized training module specific to the identified one or more training areas, wherein generating the customized training module includes training a machine learning engine based on the user selections to dynamically adapt a training module template to the identified one or more training areas for the user; and send, to the enterprise user device, the customized training module, wherein sending the customized training module to the enterprise user device causes the enterprise user device to display a training interface that allows the user to interactively complete the customized training module.

2. The computing platform of claim 1, wherein identifying one or more training areas for the user includes calculating a user performance score based on the user selections.

3. The computing platform of claim 2, wherein the user performance score includes a first score component based on portions of the simulated attack message correctly selected and a second score components based on portions of the simulated attack message correctly not selected.

4. The computing platform of claim 1,
wherein the user selections annotating selected elements of the plurality of r elements of the simulated attack message are received responsive to displaying the simulated attack message in an email client application, and
wherein an initial user selection includes an interaction with the simulated attack message indicating that the simulated attack message has been marked as potentially suspicious or indicating that a user at the enterprise user device fell for the simulated attacked message.

5. The computing platform of claim 1, wherein the user selections annotating selected elements of the plurality of interactive elements of the simulated attack message are received responsive to displaying a prompt at the enterprise user device to identify one or more potentially malicious elements of the simulated attack message.

6. The computing platform of claim 1, wherein the user selections annotating selected elements of the plurality of interactive elements of the simulated attack message are received responsive to providing, at the enterprise user device, one or more annotation tools to allow user selections of elements of the simulated attack message.

7. The computing platform of claim 1, wherein the memory stores additional computer-readable instructions that, when executed by the at least one processor, cause the computing platform to:
receive, from the enterprise user device, additional user selections categorizing the selected elements from a list of types of malicious elements.

8. The computing platform of claim 1, wherein the user selections annotating selected elements of the plurality of interactive elements of the simulated attack message are received responsive to displaying the simulated attack message in a cybersecurity training application.

9. The computing platform of claim 1, wherein the memory stores additional computer-readable instructions that, when executed by the at least one processor, cause the computing platform to:
aggregate user selections received from a plurality of enterprise user devices; and
transmit the aggregated user selections to an administrator computing device.

10. The computing platform of claim 1, wherein the memory stores additional computer-readable instructions that, when executed by the at least one processor, cause the computing platform to:
compute a frequency with which elements are correctly selected by users.

11. The computing platform of claim 10,
wherein generating the simulated attack message includes assigning a baseline score weighting to each element of the plurality of interactive elements, and
wherein the memory stores additional computer-readable instructions that, when executed by the at least one processor, cause the computing platform to:
assign an adjusted score weighting for each element of the plurality of interactive elements based on the computed frequency with which elements are correctly selected by users.

12. The computing platform of claim 11, wherein identifying one or more training areas for the user includes calculating a user performance score based on the user selections and the adjusted score weighting for each element.

13. The computing platform of claim 10, wherein the memory stores additional computer-readable instructions that, when executed by the at least one processor, cause the computing platform to:
update a machine learning model used in generating the simulated attack message based on the computed frequency with which elements are correctly selected by users.

14. A method, comprising:
at a computing platform comprising at least one processor, a communication interface, and memory:
generating, by the at least one processor, an electronic message including a simulated attack message;
sending, by the at least one processor, via the communication interface, the simulated attack message to an enterprise user device, wherein sending the simulated attack message causes the enterprise user device to interactively display a simulated attack interface comprising a plurality of interactive elements;
receiving, by the at least one processor, from the enterprise user device, user selections annotating selected elements of the plurality of interactive elements of the simulated attack message, wherein receiving the user selections annotating selected elements of the plurality of interactive elements of the simulated attack message includes receiving markers proximate the selected elements dynamically modifying the simulated attack interface;
identifying, by the at least one processor, one or more training areas for a user based on the user selections received from the enterprise user device;
generating, by the at least one processor, a customized training module specific to the identified one or more training areas, wherein generating the customized training module includes training a machine learning engine based on the user selections to dynamically adapt a training module template to the identified one or more training areas for the user; and sending, by the at least one processor, the customized training module to the enterprise user device, wherein sending the customized training module to the enterprise user device causes the enterprise user device to display a training interface that allows the user to interactively complete the customized training module.

15. The method of claim 14, further comprising:
computing, by the at least one processor, a frequency with which elements are correctly selected by users.

16. The method of claim 15, wherein generating the simulated attack message includes assigning a baseline score weighting to each element of the plurality of interactive elements, and the method further comprising:
assigning, by the at least one processor, an adjusted score weighting for each element of the plurality of interactive elements based on the computed frequency with which elements are correctly selected by users.

17. The method of claim 16, wherein identifying one or more training areas for the user includes calculating a user performance score based on the user selections and the adjusted score weighting for each element.

18. The method of claim 15, further comprising:
updating, by the at least one processor, a machine learning model used in generating the simulated attack message based on the computed frequency with which elements are correctly selected by users.

19. The method of claim 14, wherein the user selections annotating selected elements of the plurality of interactive elements of the simulated attack message are received responsive to displaying the simulated attack message in a cybersecurity training application.

20. One or more non-transitory computer-readable media storing instructions that, when executed by a computing platform comprising at least one processor, a communication interface, and memory, cause the computing platform to:

generate an electronic message including a simulated attack message;

send, to an enterprise user device, the simulated attack message, wherein sending the simulated attack message causes the enterprise user device to interactively display a simulated attack interface comprising a plurality of interactive elements;

receive, from the enterprise user device, user selections annotating selected elements of the plurality of interactive elements of the simulated attack message, wherein receiving the user selections annotating selected elements of the plurality of interactive elements of the simulated attack message includes receiving markers proximate the selected elements dynamically modifying the simulated attack interface;

identify one or more training areas for the user based on the user selections received from the enterprise user device;

generate a customized training module specific to the identified one or more training areas, wherein generating the customized training module includes training a machine learning engine based on the user selections to dynamically adapt a training module template to the identified one or more training areas for the user; and send, to the enterprise user device, the customized training module, wherein sending the customized training module to the enterprise user device causes the enterprise user device to display a training interface that allows the user to interactively complete the customized training module.

* * * * *